(12) United States Patent
Tegreene et al.

(10) Patent No.: US 10,056,690 B2
(45) Date of Patent: Aug. 21, 2018

(54) TUNABLE MEDIUM LINEAR CODER

(71) Applicant: Elwha LLC, Bellevue, WA (US)

(72) Inventors: Clarence T. Tegreene, Mercer Island, WA (US); Yaroslav A. Urzhumov, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 30 days.

(21) Appl. No.: 15/409,401

(22) Filed: Jan. 18, 2017

(65) Prior Publication Data

US 2018/0205152 A1   Jul. 19, 2018

(51) Int. Cl.
*H01Q 3/26* (2006.01)
*H01Q 9/04* (2006.01)
*H04B 7/0456* (2017.01)

(52) U.S. Cl.
CPC ......... *H01Q 9/0442* (2013.01); *H04B 7/0482* (2013.01)

(58) Field of Classification Search
CPC .......................... H01Q 9/0442; H04B 7/0482
See application file for complete search history.

(56) References Cited

U.S. PATENT DOCUMENTS

| | | |
|---|---|---|
| 8,848,295 B2 | 9/2014 | Smith et al. |
| 2010/0136926 A1 | 6/2010 | Lackey |
| 2011/0260920 A1 | 10/2011 | Dybdal et al. |
| 2014/0056378 A1 | 2/2014 | Harel et al. |
| 2017/0356980 A1* | 12/2017 | Islam .................... G01S 5/0289 |

OTHER PUBLICATIONS

N. Kundtz & D. Smith, "Extreme-Angle Broadband Metamaterial Len," Nature Mat. 9, p. 129 (2010).
D. Smith, Y. Urzumov et al., "Enhancing imaging systems using transformation optics" Optics Express 18, 21238 (2010).
Zhang et al.; "Optimal Load Analysis for a Two-Receiver Wireless Power Transfer System"; Wireless Power Transfer Conference (WPTC), 2014 IEEE 2014; pp. 84-87.

* cited by examiner

*Primary Examiner* — Dameon E Levi
*Assistant Examiner* — David Lotter

(57) ABSTRACT

An antenna system includes near-end electromagnetic (EM) radiating elements, a tunable medium, and control circuitry. The tunable medium includes EM scattering elements corresponding to lumped impedance elements and variable impedance control inputs configured to enable selection of an impedance value for each of the lumped impedance elements. The control circuitry is configured to determine a scattering matrix (S-matrix) relating field amplitudes at lumped ports including internal lumped ports and external lumped ports. The internal lumped ports correspond to the lumped impedance elements, and the external lumped ports correspond to the near-end EM radiating elements or far-end near-end EM radiating elements. A method includes determining at least a portion of component values of a desired S-matrix, and adjusting the variable impedance control inputs to modify the impedance value of the lumped impedance elements to cause the S-matrix to at least approximate at least a portion of the desired S-matrix.

39 Claims, 7 Drawing Sheets

TUNABLE MEDIUM LINEAR CODER

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc. applications of the Priority Application(s)).

PRIORITY APPLICATIONS

None

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

DETAILED DESCRIPTION

Figure 1:
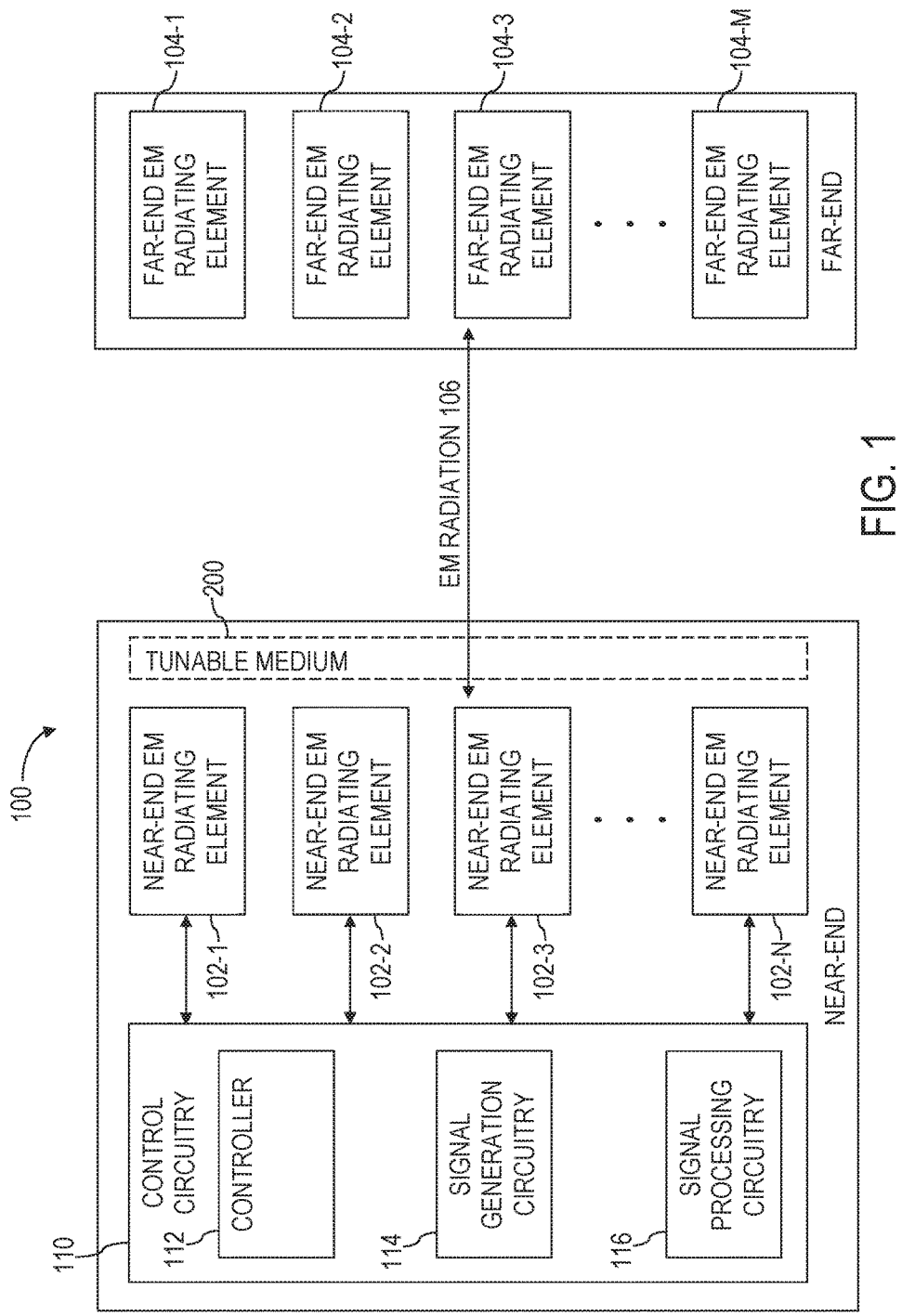
FIG. 1 is a simplified block diagram of an antenna system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

Disclosed in some embodiments herein is an antenna system including a plurality of near-end electromagnetic (EM) radiating elements, a tunable medium, and control circuitry. The tunable medium is positioned relative to the plurality of near-end EM radiating elements and a plurality of far-end EM radiating elements to scatter EM radiation transmitted between the plurality of near-end EM radiating elements and the plurality of far-end EM radiating elements. The control circuitry includes a controller operably coupled to the tunable medium. The controller is programmed to modify EM properties of the tunable medium to modify the EM radiation transmitted between the plurality of near-end EM radiating elements and the plurality of far-end EM radiating elements.

Disclosed in some embodiments herein is a method of operating an antenna system. The method includes operating a plurality of near-end electromagnetic (EM) radiating elements, and scattering EM radiation transmitted between the plurality of near-end EM radiating elements and a plurality of far-end EM radiating elements with a tunable medium. The method also includes modifying EM properties of the tunable medium to modify the EM radiation transmitted between the plurality of near-end EM radiating elements and the plurality of far-end EM radiating elements.

Embodiments of the disclosure include antenna systems and related methods for tunable medium linear coders. Although the disclosure is generally described in terms of wireless communications (e.g., MIMO systems), the disclosure is not so limited. For example, embodiments of the disclosure also contemplate RADAR systems, wireless power systems, and any other systems where tunable medium linear coders would be helpful or desirable.

As used herein, the terms "coder," "precoder," and "decoder" refer to coding (i.e., precoding and/or decoding) for at least one of linear beamforming, linear spatial-diversity, and linear spatial multiplexing. This is in contrast to coders that perform time-domain analog modulation of signals for communication systems.

As used herein, the terms "EM radiating element" and "EM radiating elements" refer to structures that controllably emit EM radiation, receive EM radiation, or a combination thereof. For example, EM radiating elements may include dipole antennas, at least substantially omnidirectional antennas, patch antennas, aperture antennas, antenna arrays (e.g., multiple antennas functioning in an array to act together as a single EM radiating element, multiple antennas functioning in an array to act as multiple EM radiating elements, etc.), other EM radiating elements, or combinations thereof. As used herein, the term "at least substantially omnidirectional" refers to antennas having far-field directivity patterns that are approximately circular (e.g., in a horizontal plane) or spherical (e.g., for three-dimensional antenna patterns). By way of non-limiting example, a dipole antenna may be considered an omnidirectional antenna because a radiation pattern in a plane perpendicular to the dipole antenna is approximately circular. As will be appreciated by those of ordinary skill in the art, truly three-dimensional omnidirectional antennas are difficult or impossible to implement in practice at least because a feed point for enabling EM input to the antenna will disrupt a perfect spherical directivity pattern. The term "at least substantially omnidirectional" accounts for this practicality.

As used herein, the term "beamforming" refers to selectively (e.g., controllably) increasing signal power at one or more locations (e.g., locations of receiving antennas), decreasing signal power at one or more other locations (e.g., locations where there are not receiving antennas), or combinations thereof.

As used herein, the term "spatial-diversity" refers to sending multiple, redundant copies of information blocks of a given data stream between a given transmitting radiating element and a given receiving radiating element following different propagation paths. When these redundant copies of information blocks arrive with different degrees of corruption (e.g., due to frequency-selective fading, time dependence of a channel between the given transmitting radiating element and the given receiving radiating element, Doppler shifts, or combinations thereof), at the given receiving radiating element, extracting valid bits of data may reduce a bit error rate (BER). Higher data throughput (bandwidth) may result. Mathematically, spatial-diversity may be described as a time-dependent linear mapping of a scalar, complex-valued signal onto a vector of output values.

As used herein, the term "spatial multiplexing" refers to multiple propagation paths to transmit multiple data streams simultaneously between transmitting EM radiating elements and receiving EM radiating elements. These multiple data streams may be transmitted using a common frequency band. The multiple data streams become multiplexed (i.e., mixed together) by a channel between the transmitting EM radiating elements and the receiving EM radiating elements, even if not already multiplexed at the transmitting EM radiating elements before transmitting. Absent non-linear interactions, this multiplexing effect of the channel (and possibly of multiplexing at the transmitting EM radiating elements before transmitting) may be described as a linear operator acting on a vector of magnitudes of transmit signals at the transmitting EM radiating elements. In other words, receive signals received at the receiving EM radiating elements are equal to a matrix multiplication of the transmit signals by a channel matrix describing the channel. The multiplexed receive signals may be demultiplexed at the transmitting EM radiating elements (i.e., with a precoder), at the receiving EM radiating elements (i.e., with a decoder), or a combination thereof. Accurate demultiplexing requires knowledge of a channel matrix H. The channel matrix H is sometimes time dependent, frequency dependent, or a combination thereof.

Precoding and decoding may both be described mathematically as linear transformations of signal vectors (i.e., matrix multiplications of signal vectors). The choice of how demultiplexing is distributed between transmitting and receiving elements may be based, at least in part, on whether channel state information (CSI) (e.g., a channel matrix) is available at the transmitting and/or receiving elements. Also, the choice of how demultiplexing is distributed between transmitting and receiving elements may be based, at least in part, on whether or not one of the transmitting and receiving elements would benefit from reduced-complexity electronics (e.g., mobile devices such as cellular telephones with limited processing and battery power may benefit from reduced-complexity electronics). In extreme cases, all the demultiplexing may be performed at only one of the transmitting and the receiving side.

Demultiplexing is achieved when a precoder matrix A and a decoder matrix B are chosen such that the matrix product AHB is a diagonal matrix, or is numerically close to a diagonal matrix (in the latter case, the off-diagonal elements represent the strength of interference between the data streams). For example, AHB=cI, where I is the identity matrix and c is a constant, achieves demultiplexing. In the special case where the decoder is absent (B=I), the precoder matrix A may be chosen such that AH is a diagonal (or numerically close to a diagonal) matrix. Again, in some cases, A may be chosen simply as the matrix inverse (or pseudoinverse) of H.

As a non-limiting example, all demultiplexing may be done at the transmitting side. A well-known technique known as the Zero Forcing technique is an example case of all demultiplexing being done at the transmitting side. This scenario is particularly attractive to multi-user multiple input multiple output (MIMO) because it allows receive antennas (e.g., a very large number of mobile devices in a cellular data network) to operate without any knowledge of the channel state, and without any cooperation with each other (which may be difficult to achieve on time scales of radio frequency modulation).

Conventional linear coders (e.g., precoders, decoders) implement matrix multiplication using the literal definition of matrix multiplication. From a practical matter, this involves splitting signals and applying digitally-controlled amplitude and phase modulations to each path, then summing the signals from the different paths. For a MIMO transmitter with D data streams and N≥D output antennas (e.g., N=D), a total of N×D (which is ≥$D^2$) attenuators, N×D phase shifters (where _x_ is the multiplication operator), and N signal-summing circuits would be required to implement such a conventional linear coder. As a result, cost for implementing these conventional linear coders increases quadratically as the number of data streams increases. Digital phase shifters tend to be particularly expensive to implement and have generally been the limiting factor for deployment of phased array systems in communications and RADAR systems. Disclosed herein are tunable medium linear coders that may be used to replace these expensive conventional coders.

As used herein, the term "near-end" refers to equipment located at a particular location (i.e., a near-end location). As used herein, the term "far-end" refers to locations located remotely from the particular location. Accordingly, the terms "near-end" and "far-end" are relative terms depending on the location of the particular location. For example, a first plurality of electromagnetic radiating elements would be a plurality of near-end electromagnetic radiating elements if located at the particular location. Also, a second plurality of electromagnetic radiating elements would be a plurality of far-end electromagnetic radiating elements if located remotely from the particular location (and, by extension, remotely from the first plurality of electromagnetic radiating elements). Conversely, if the particular location were instead deemed to be at the same location as the second plurality of electromagnetic radiating elements, the first plurality of electromagnetic radiating elements would be a plurality of far-end electromagnetic radiating elements. Also, the second plurality of electromagnetic radiating elements would be a plurality of near-end electromagnetic radiating elements if the particular location were deemed to be at the same location as the second plurality of electromagnetic radiating elements.

Various features disclosed herein may be applied alone or in combination with others of the features disclosed herein. These features are too numerous to explicitly indicate herein each and every other one of the features that may be combined therewith. Therefore, any feature disclosed herein that is practicable, in the view of one of ordinary skill, to combine with any other one or more others of the features disclosed herein, is contemplated herein to be combined. A non-exhaustive list of some of these disclosed features that may be combined with others of the disclosed features follows.

For example, in some embodiments, disclosed is an antenna system including a plurality of near-end electromagnetic (EM) radiating elements, a tunable medium, and control circuitry. The tunable medium is positioned relative to the plurality of near-end EM radiating elements and a plurality of far-end EM radiating elements to scatter EM radiation transmitted between the plurality of near-end EM radiating elements and the plurality of far-end EM radiating elements. The control circuitry includes a controller operably coupled to the tunable medium and programmed to modify EM properties of the tunable medium to modify the EM radiation transmitted between the plurality of near-end EM radiating elements and the plurality of far-end EM radiating elements.

In some embodiments, disclosed is an antenna system including a controller, wherein the controller is configured to dynamically modify EM properties of a tunable medium to dynamically modify EM radiation transmitted between a plurality of near-end EM radiating elements and a plurality of far-end EM radiating elements during operation of the antenna system.

In some embodiments, disclosed is an antenna system including a controller, wherein the controller is configured to pre-select a state of a tunable medium and hold the tunable medium in the selected state during operation of the antenna system.

In some embodiments, disclosed is an antenna system including control circuitry, wherein the control circuitry includes signal generation circuitry operably coupled to a plurality of near-end EM radiating elements and configured to deliver EM signals including a plurality of different data streams to the plurality of near-end EM radiating elements for transmission to a plurality of far-end EM radiating elements.

In some embodiments, disclosed is an antenna system including control circuitry, wherein the control circuitry includes signal processing circuitry operably coupled to a plurality of near-end EM radiating elements and configured to receive EM signals including a plurality of different data streams from a plurality of far-end EM radiating elements through the plurality of near-end EM radiating elements.

In some embodiments, disclosed is an antenna system including a plurality of far-end EM radiating elements, wherein the plurality of far-end EM radiating elements is distributed between at least two physically separate devices.

In some embodiments, disclosed is an antenna system including a plurality of far-end EM radiating elements, wherein a number of a plurality of data streams is equal to a number of the plurality of far-end EM radiating elements, and each of the plurality of far-end EM radiating elements receives only one of the plurality of data streams.

In some embodiments, disclosed is an antenna system including a plurality of far-end EM radiating elements, wherein a number of a plurality of data streams is equal to a number of the plurality of far-end EM radiating elements, and each of the plurality of far-end EM radiating elements transmits only one of the plurality of data streams.

In some embodiments, disclosed is an antenna system including a plurality of far-end EM radiating elements, wherein a number of a plurality of data streams is less than a number of the plurality of far-end EM radiating elements.

In some embodiments, disclosed is an antenna system including a plurality of near-end EM radiating elements, wherein a number of the plurality of near-end EM radiating elements is equal to a number of a plurality of data streams.

In some embodiments, disclosed is an antenna system including a plurality of near-end EM radiating elements, wherein a number of the plurality of near-end EM radiating elements is greater than a number of a plurality of data streams.

In some embodiments, disclosed is an antenna system including a plurality of near-end EM radiating elements, wherein at least one of the plurality of near-end EM radiating elements includes a dipole antenna.

In some embodiments, disclosed is an antenna system including a plurality of near-end EM radiating elements, wherein at least one of the plurality of near-end EM radiating elements includes an at least substantially omnidirectional antenna.

In some embodiments, disclosed is an antenna system including an at least substantially omnidirectional antenna, wherein the at least substantially omnidirectional antenna includes a dipole antenna that is at least substantially omnidirectional in a plane perpendicular to the dipole antenna.

In some embodiments, disclosed is an antenna system including a plurality of near-end EM radiating elements, wherein at least one of the plurality of near-end EM radiating elements includes a patch antenna.

In some embodiments, disclosed is an antenna system including a plurality of near-end EM radiating elements, wherein at least one of the plurality of near-end EM radiating elements includes an aperture antenna.

In some embodiments, disclosed is an antenna system including a plurality of near-end EM radiating elements, wherein at least one of the plurality of near-end EM radiating elements includes an antenna array.

In some embodiments, disclosed is an antenna system including a tunable medium, wherein the tunable medium includes a tunable metamaterial including a plurality of tunable EM scattering elements.

In some embodiments, disclosed is an antenna system including a plurality of tunable EM scattering elements, wherein at least one of the plurality of tunable EM scattering elements includes a tunable-impedance two-port lumped circuit element.

In some embodiments, disclosed is an antenna system including a plurality of tunable EM scattering elements, wherein the plurality of tunable EM scattering elements includes a plurality of tunable capacitive elements.

In some embodiments, disclosed is an antenna system including a plurality of tunable capacitive elements, wherein the plurality of tunable capacitive elements includes at least one of diodes and transistors.

In some embodiments, disclosed is an antenna system including a plurality of tunable capacitive elements, wherein the plurality of tunable capacitive elements includes at least one variable dielectric constant material.

In some embodiments, disclosed is an antenna system including a plurality of tunable capacitive elements, wherein the plurality of tunable capacitive elements includes at least one liquid crystal element.

In some embodiments, disclosed is an antenna system including a plurality of tunable EM scattering elements, wherein the plurality of tunable EM scattering elements includes a plurality of variable resistive elements.

In some embodiments, disclosed is an antenna system including a plurality of variable resistive elements, wherein the plurality of variable resistive elements includes at least one of diodes and transistors.

In some embodiments, disclosed is an antenna system including a plurality of tunable EM scattering elements, wherein the plurality of tunable EM scattering elements includes a plurality of variable inductance elements.

In some embodiments, disclosed is an antenna system including a tunable medium, wherein the tunable medium is tunable with a number of degrees of freedom that is greater than or equal to a number of independent elements of a channel matrix of channels between a plurality of near-end EM radiating elements and a plurality of far-end EM radiating elements.

In some embodiments, disclosed is an antenna system including a tunable medium, wherein the tunable medium is located in front of a plurality of near-end EM radiating elements with a front side of the plurality of near-end EM radiating elements facing generally towards a plurality of far-end EM radiating elements.

In some embodiments, disclosed is an antenna system including control circuitry including a controller operably coupled to a tunable medium, wherein the controller is programmed to control the tunable medium to scatter EM radiation at least substantially in a forward direction relative to a plurality of near-end EM radiating elements.

In some embodiments, disclosed is an antenna system including control circuitry including a controller operably coupled to a tunable medium, wherein the controller is programmed to control the tunable medium to scatter EM radiation at least substantially in a backward direction relative to a plurality of near-end EM radiating elements.

In some embodiments, disclosed is an antenna system including control circuitry including a controller operably coupled to a tunable medium, wherein the controller is programmed to control the tunable medium to scatter EM radiation at least substantially in a direction of a specular reflection relative to a surface of a body carrying a plurality of near-end EM radiating elements.

In some embodiments, disclosed is an antenna system including control circuitry including a controller operably coupled to a tunable medium, wherein the controller is programmed to control the tunable medium to scatter EM radiation at least substantially in a direction towards a plurality of far-end EM radiating elements.

In some embodiments, disclosed is an antenna system including a tunable medium, wherein the tunable medium at least partially surrounds at least a portion of a plurality of near-end EM radiating elements.

In some embodiments, disclosed is an antenna system including a tunable medium, wherein the tunable medium includes a tunable radome.

In some embodiments, disclosed is an antenna system including a controller, wherein the controller is programmed to dynamically tune a tunable medium to function as a linear beamforming precoder.

In some embodiments, disclosed is an antenna system including a controller, wherein the controller is programmed to dynamically tune a tunable medium to function as a linear beamforming decoder.

In some embodiments, disclosed is an antenna system including a controller, wherein the controller is programmed to dynamically tune a tunable medium to function as a linear spatial-diversity precoder.

In some embodiments, disclosed is an antenna system including a controller, wherein the controller is programmed to dynamically tune a tunable medium to function as a linear spatial-diversity decoder.

In some embodiments, disclosed is an antenna system including a controller, wherein the controller is programmed to dynamically tune a tunable medium to function as a linear spatial multiplexing precoder.

In some embodiments, disclosed is an antenna system including a controller, wherein the controller is programmed to dynamically tune a tunable medium to function as a linear spatial multiplexing decoder.

In some embodiments, disclosed is an antenna system including a controller, wherein the controller is programmed to dynamically determine a channel matrix of channels between a plurality of near-end EM radiating elements and a plurality of far-end EM radiating elements, and dynamically tune a tunable medium as a function of the determined channel matrix.

In some embodiments, disclosed is an antenna system including a controller operably coupled to a tunable medium, wherein the controller is programmed to determine values of control parameters of the tunable medium.

In some embodiments, disclosed is an antenna system including a controller operably coupled to a tunable medium, wherein the controller is programmed to determine values of control parameters of the tunable medium by solving an inverse scattering problem, wherein the inverse scattering problem is postulated as an equality between a determined extended channel matrix and a desired extended channel matrix.

In some embodiments, disclosed is an antenna system including a controller operably coupled to a tunable medium, wherein the controller is programmed to determine values of control parameters of the tunable medium by determining a minimization of a matrix norm of a difference between a determined extended channel matrix and a desired extended channel matrix.

In some embodiments, disclosed is an antenna system including a controller operably coupled to a tunable medium, wherein the controller is programmed to determine values of control parameters of the tunable medium by determining a minimization of a sum of squared differences between at least a portion of values from a determined extended channel matrix and corresponding values of a desired extended channel matrix.

In some embodiments, disclosed is an antenna system including a controller operably coupled to a tunable medium, wherein the controller is programmed to determine values of control parameters of the tunable medium by determining a minimization of a sum of squared differences between at least a portion of values from a determined extended channel matrix and corresponding values of a desired extended channel matrix, plus a weighted sum of frequency dispersion magnitudes of the portion of values.

In some embodiments, disclosed is an antenna system including a controller, wherein the controller is programmed such that a precoder matrix of a tunable medium is at least approximately equal to $U^\dagger$, where $U\Sigma V^\dagger$ is a singular value decomposition of a determined channel matrix, and $U^\dagger$ is the conjugate transpose of unitary matrix U.

In some embodiments, disclosed is an antenna system including a controller, wherein the controller is programmed such that a decoder matrix of a tunable medium is at least approximately equal to V, where $U\Sigma V^\dagger$ is a singular value decomposition of a determined channel matrix, and V is the conjugate transpose of unitary matrix $V^\dagger$.

In some embodiments, disclosed is an antenna system including a controller, wherein the controller is programmed such that a precoder matrix of a tunable medium is at least approximately equal to a left pseudo-inverse of a determined channel matrix.

In some embodiments, disclosed is an antenna system including a controller, wherein the controller is programmed such that a decoder matrix of a tunable medium is at least approximately equal to a right pseudo-inverse of a determined channel matrix.

In some embodiments, disclosed is an antenna system including a controller, wherein the controller is programmed such that a precoder matrix of a tunable medium multiplied by a determined channel matrix produces a matrix that is approximately equal to a diagonal matrix.

In some embodiments, disclosed is an antenna system including a controller, wherein the controller is programmed such that a determined channel matrix multiplied by a decoder matrix of a tunable medium produces a matrix that is approximately equal to a diagonal matrix.

In some embodiments, disclosed is an antenna system including a controller, wherein the controller is programmed such that a precoder matrix of a tunable medium multiplied by a determined channel matrix produces a matrix having off-diagonal elements, wherein a magnitude of each of the off-diagonal elements is less than or equal to a predetermined threshold value.

In some embodiments, disclosed is an antenna system including a controller, wherein the controller is programmed such that a determined channel matrix multiplied by a decoder matrix of a tunable medium produces a matrix having off-diagonal elements, wherein a magnitude of each of the off-diagonal elements is less than or equal to a predetermined threshold value.

In some embodiments, disclosed is an antenna system including a controller, wherein the controller is programmed such that a matrix product between a precoder matrix of a tunable medium and a determined channel matrix multiplied by a decoder matrix of a far-end decoder is approximately equal to a diagonal matrix.

In some embodiments, disclosed is an antenna system including a controller, wherein the controller is programmed such that a matrix product between a precoder matrix of a far-end precoder and a determined channel matrix multiplied by a decoder matrix of a tunable medium is approximately equal to a diagonal matrix.

In some embodiments, disclosed is an antenna system including a controller, wherein the controller is programmed such that a matrix product between a precoder matrix of a tunable medium and a determined channel matrix multiplied by a decoder matrix of a far-end decoder results in a matrix having off-diagonal elements, wherein a magnitude of each of the off-diagonal elements is less than or equal to a predetermined threshold value.

In some embodiments, disclosed is an antenna system including a controller, wherein the controller is programmed such that a matrix product between a precoder matrix of a far-end precoder and a determined channel matrix multiplied by a decoder matrix of the tunable medium results in a matrix having off-diagonal elements, wherein a magnitude of each of the off-diagonal elements is less than or equal to a predetermined threshold value.

In some embodiments, disclosed is a method of operating an antenna system. The method includes operating a plurality of near-end electromagnetic (EM) radiating elements, and scattering EM radiation transmitted between the plurality of near-end EM radiating elements and a plurality of far-end EM radiating elements with a tunable medium. The method also includes modifying EM properties of the tunable medium to modify the EM radiation transmitted between the plurality of near-end EM radiating elements and the plurality of far-end EM radiating elements.

In some embodiments, disclosed is a method of operating an antenna system including modifying EM properties of a tunable medium, wherein modifying EM properties of a tunable medium includes dynamically modifying the EM properties of the tunable medium during operation of the antenna system.

In some embodiments, disclosed is a method of operating an antenna system including modifying EM properties of a tunable medium, wherein modifying EM properties of a tunable medium includes pre-selecting a state of the tunable medium and holding the tunable medium in the selected state during operation of the antenna system.

In some embodiments, disclosed is a method of operating an antenna system including delivering EM signals including a plurality of different data streams to a plurality of near-end EM radiating elements for transmission to a plurality of far-end EM radiating elements.

In some embodiments, disclosed is a method of operating an antenna system including receiving EM signals including a plurality of different data streams from a plurality of far-end EM radiating elements through a plurality of near-end EM radiating elements.

In some embodiments, disclosed is a method of operating an antenna system including delivering EM signals, wherein delivering EM signals includes delivering the EM signals to a plurality of near-end EM radiating elements for transmission to a plurality of far-end EM radiating elements distributed between at least two physically separate devices.

In some embodiments, disclosed is a method of operating an antenna system including receiving EM signals, wherein receiving EM signals includes receiving the EM signals from a plurality of far-end EM radiating elements distributed between at least two physically separate devices.

In some embodiments, disclosed is a method of operating an antenna system including delivering EM signals, wherein delivering EM signals includes delivering EM signals including a number of different data streams that is equal to a number of a plurality of far-end EM radiating elements, each of the plurality of far-end EM radiating elements receiving only one of the plurality of data streams.

In some embodiments, disclosed is a method of operating an antenna system including receiving EM signals, wherein receiving EM signals includes receiving EM signals including a number of different data streams that is equal to a number of a plurality of far-end EM radiating elements, and each of the plurality of far-end EM radiating elements transmits only one of the plurality of data streams.

In some embodiments, disclosed is a method of operating an antenna system including delivering EM signals, wherein delivering EM signals includes delivering EM signals including a number of different data streams that is less than a number of a plurality of far-end EM radiating elements.

In some embodiments, disclosed is a method of operating an antenna system including receiving EM signals, wherein receiving EM signals includes receiving EM signals including a number of different data streams that is less than a number of a plurality of far-end EM radiating elements.

In some embodiments, disclosed is a method of operating an antenna system including delivering EM signals, wherein delivering EM signals includes delivering EM signals including a number of different data streams that is equal to a number of a plurality of near-end EM radiating elements.

In some embodiments, disclosed is a method of operating an antenna system including receiving EM signals, wherein receiving EM signals includes receiving EM signals including a number of different data streams that is equal to a number of a plurality of near-end EM radiating elements.

In some embodiments, disclosed is a method of operating an antenna system including delivering EM signals, wherein delivering EM signals includes delivering EM signals including a number of different data streams that is less than a number of a plurality of near-end EM radiating elements.

In some embodiments, disclosed is a method of operating an antenna system including receiving EM signals, wherein receiving EM signals includes receiving EM signals including a number of different data streams that is less than a number of a plurality of near-end EM radiating elements.

In some embodiments, disclosed is a method of operating an antenna system including operating a plurality of near-end EM radiating elements, wherein operating a plurality of near-end EM radiating elements includes operating at least one dipole antenna.

In some embodiments, disclosed is a method of operating an antenna system including operating a plurality of near-end EM radiating elements, wherein operating a plurality of near-end EM radiating elements includes operating an at least substantially omnidirectional antenna.

In some embodiments, disclosed is a method of operating an antenna system including operating an at least substantially omnidirectional antenna, wherein operating an at least substantially omnidirectional antenna includes operating a dipole antenna that is at least substantially omnidirectional in a plane perpendicular to the dipole antenna.

In some embodiments, disclosed is a method of operating an antenna system including operating a plurality of near-end EM radiating elements, wherein operating a plurality of near-end EM radiating elements includes operating at least one patch antenna.

In some embodiments, disclosed is a method of operating an antenna system including operating a plurality of near-end EM radiating elements, wherein operating a plurality of near-end EM radiating elements includes operating at least one aperture antenna.

In some embodiments, disclosed is a method of operating an antenna system including operating a plurality of near-end EM radiating elements, wherein operating a plurality of near-end EM radiating elements includes operating a plurality of antenna arrays.

In some embodiments, disclosed is a method of operating an antenna system including scattering EM radiation with a tunable medium, wherein scattering EM radiation with a tunable medium includes scattering the EM radiation with a tunable metamaterial including a plurality of tunable EM scattering elements.

In some embodiments, disclosed is a method of operating an antenna system including scattering EM radiation with a tunable metamaterial including a plurality of tunable EM scattering elements, wherein scattering EM radiation with a tunable metamaterial including a plurality of tunable EM scattering elements includes scattering the EM radiation with at least one tunable-impedance two-port lumped circuit element.

In some embodiments, disclosed is a method of operating an antenna system including scattering EM radiation with a tunable metamaterial including a plurality of tunable EM scattering elements, wherein scattering EM radiation with a tunable metamaterial including a plurality of tunable EM scattering elements includes scattering the EM radiation with a plurality of tunable capacitive elements.

In some embodiments, disclosed is a method of operating an antenna system including scattering EM radiation with a plurality of tunable capacitive elements, wherein scattering EM radiation with a plurality of tunable capacitive elements includes scattering the EM radiation with at least one of diodes and transistors.

In some embodiments, disclosed is a method of operating an antenna system including scattering EM radiation with a plurality of tunable capacitive elements, wherein scattering EM radiation with a plurality of tunable capacitive elements includes scattering the EM radiation with at least one variable dielectric constant material.

In some embodiments, disclosed is a method of operating an antenna system including scattering EM radiation with a plurality of tunable capacitive elements, wherein scattering EM radiation with a plurality of tunable capacitive elements includes scattering the EM radiation with at least one liquid crystal element.

In some embodiments, disclosed is a method of operating an antenna system including scattering EM radiation with a tunable metamaterial including a plurality of tunable EM scattering elements, wherein scattering EM radiation with a tunable metamaterial including a plurality of tunable EM scattering elements includes scattering the EM radiation with a plurality of variable resistive elements.

In some embodiments, disclosed is a method of operating an antenna system including scattering EM radiation with a plurality of variable resistive elements, wherein scattering EM radiation with a plurality of variable resistive elements includes scattering the EM radiation with at least one of diodes and transistors.

In some embodiments, disclosed is a method of operating an antenna system including scattering EM radiation with a tunable metamaterial including a plurality of tunable EM scattering elements, wherein scattering EM radiation with a tunable metamaterial including a plurality of tunable EM scattering elements includes scattering the EM radiation with a plurality of variable inductance elements.

In some embodiments, disclosed is a method of operating an antenna system including scattering EM radiation with a tunable medium, wherein scattering EM radiation with a tunable medium includes scattering the EM radiation with a tunable medium that is tunable with a number of degrees of freedom that is greater than or equal to a number of independent elements of a channel matrix of channels between a plurality of near-end EM radiating elements and a plurality of far-end EM radiating elements.

In some embodiments, disclosed is a method of operating an antenna system including operating a plurality of near-end EM radiating elements, wherein operating a plurality of near-end EM radiating elements includes operating the plurality of near-end EM radiating elements with a tunable medium located in front of the plurality of near-end EM radiating elements with a front side of the plurality of near-end EM radiating elements facing generally towards a plurality of far-end EM radiating elements.

In some embodiments, disclosed is a method of operating an antenna system including scattering EM radiation transmitted between a plurality of near-end EM radiating elements and a plurality of far-end EM radiating elements, wherein scattering EM radiation transmitted between the plurality of near-end EM radiating elements and a plurality of far-end EM radiating elements includes scattering the EM radiation at least substantially in a forward direction relative to the plurality of near-end EM radiating elements.

In some embodiments, disclosed is a method of operating an antenna system including scattering EM radiation transmitted between a plurality of near-end EM radiating elements and a plurality of far-end EM radiating elements, wherein scattering EM radiation transmitted between the plurality of near-end EM radiating elements and a plurality of far-end EM radiating elements includes scattering the EM radiation at least substantially in a backward direction relative to the plurality of near-end EM radiating elements.

In some embodiments, disclosed is a method of operating an antenna system including scattering EM radiation transmitted between a plurality of near-end EM radiating elements and a plurality of far-end EM radiating elements, wherein scattering EM radiation transmitted between the plurality of near-end EM radiating elements and a plurality of far-end EM radiating elements includes scattering the EM radiation at least substantially in a direction of a specular reflection relative to a surface of a body carrying the plurality of near-end EM radiating elements.

In some embodiments, disclosed is a method of operating an antenna system including scattering EM radiation transmitted between a plurality of near-end EM radiating elements and a plurality of far-end EM radiating elements, wherein scattering EM radiation transmitted between the plurality of near-end EM radiating elements and a plurality of far-end EM radiating elements includes scattering the EM radiation at least substantially in a direction towards the plurality of far-end EM radiating elements.

In some embodiments, disclosed is a method of operating an antenna system including operating a plurality of near-end EM radiating elements, wherein operating a plurality of near-end EM radiating elements includes operating the plurality of near-end EM radiating elements with a tunable medium at least partially surrounding at least a portion of the plurality of near-end EM radiating elements.

In some embodiments, disclosed is a method of operating an antenna system including operating a plurality of near-end EM radiating elements with a tunable medium at least partially surrounding at least a portion of the plurality of near-end EM radiating elements, wherein operating the plurality of near-end EM radiating elements with the tunable medium at least partially surrounding at least a portion of the plurality of near-end EM radiating elements includes operating the plurality of near-end EM radiating elements inside of a tunable radome including the tunable medium.

In some embodiments, disclosed is a method of operating an antenna system, the method including dynamically tuning a tunable medium to function as a linear beamforming precoder.

In some embodiments, disclosed is a method of operating an antenna system, the method including dynamically tuning a tunable medium to function as a linear beamforming decoder.

In some embodiments, disclosed is a method of operating an antenna system, the method including dynamically tuning the tunable medium to function as a linear spatial-diversity precoder.

In some embodiments, disclosed is a method of operating an antenna system, the method including dynamically tuning the tunable medium to function as a linear spatial-diversity decoder.

In some embodiments, disclosed is a method of operating an antenna system, the method including dynamically tuning a tunable medium to function as a linear spatial multiplexing precoder.

In some embodiments, disclosed is a method of operating an antenna system, the method including dynamically tuning a tunable medium to function as a linear spatial multiplexing decoder.

In some embodiments, disclosed is a method of operating an antenna system including dynamically tuning a tunable medium to function as a linear spatial multiplexing precoder, wherein dynamically tuning a tunable medium to function as a linear spatial multiplexing precoder includes dynamically determining a channel matrix of channels between a plurality of near-end EM radiating elements and a plurality of far-end EM radiating elements, and dynamically tuning the tunable medium as a function of the determined channel matrix.

In some embodiments, disclosed is a method of operating an antenna system including dynamically tuning a tunable medium to function as a linear spatial multiplexing decoder, wherein dynamically tuning the tunable medium to function as a linear spatial multiplexing decoder includes dynamically determining a channel matrix of channels between a plurality of near-end EM radiating elements and a plurality of far-end EM radiating elements, and dynamically tuning the tunable medium as a function of the determined channel matrix.

In some embodiments, disclosed is a method of operating an antenna system including dynamically tuning the tunable medium as a function of a determined channel matrix, wherein dynamically tuning a tunable medium as a function of a determined channel matrix comprises determining values of control parameters of the tunable medium.

In some embodiments, disclosed is a method of operating an antenna system including determining values of control parameters of a tunable medium, wherein determining values of control parameters of a tunable medium includes solving an inverse scattering problem, wherein the inverse scattering problem is postulated as an equality between a determined extended channel matrix and a desired extended channel matrix.

In some embodiments, disclosed is a method of operating an antenna system including determining values of control parameters of a tunable medium, wherein determining values of control parameters of a tunable medium includes determining a minimization of a matrix norm of a difference between a determined extended channel matrix and a desired extended channel matrix.

In some embodiments, disclosed is a method of operating an antenna system including determining values of control parameters of a tunable medium, wherein determining values of control parameters of a tunable medium includes determining a minimization of a sum of squared differences between at least a portion of values from a determined extended channel matrix and corresponding values of a desired extended channel matrix.

In some embodiments, disclosed is a method of operating an antenna system including determining values of control parameters of a tunable medium, wherein determining values of control parameters of a tunable medium includes determining a minimization of a sum of squared differences between at least a portion of values from a determined extended channel matrix and corresponding values of a desired extended channel matrix, plus a weighted sum of frequency dispersion magnitudes of the portion of values.

In some embodiments, disclosed is a method of operating an antenna system including dynamically tuning a tunable medium as a function of a determined channel matrix, wherein dynamically tuning a tunable medium as a function of a determined channel matrix includes tuning the tunable medium such that a precoder matrix of the tunable medium is at least approximately equal to $U^\dagger$, where $U\Sigma V^\dagger$ is a singular value decomposition of the determined channel matrix, and $U^\dagger$ is the conjugate transpose of unitary matrix U.

In some embodiments, disclosed is a method of operating an antenna system including dynamically tuning a tunable medium as a function of a determined channel matrix, wherein dynamically tuning the tunable medium as a function of the determined channel matrix includes tuning the tunable medium such that a decoder matrix of the tunable medium is at least approximately equal to V, where $U\Sigma V^\dagger$ is a singular value decomposition of the determined channel matrix, and V is the conjugate transpose of unitary matrix $V^\dagger$.

In some embodiments, disclosed is a method of operating an antenna system including dynamically tuning a tunable medium as a function of a determined channel matrix, wherein dynamically tuning a tunable medium as a function of a determined channel matrix includes tuning the tunable medium such that a precoder matrix of the tunable medium is at least approximately equal to a left pseudo-inverse of the determined channel matrix.

In some embodiments, disclosed is a method of operating an antenna system including dynamically tuning a tunable medium as a function of a determined channel matrix, wherein dynamically tuning the tunable medium as a function of the determined channel matrix includes tuning the tunable medium such that a decoder matrix of the tunable medium is at least approximately equal to a right pseudo-inverse of the determined channel matrix.

In some embodiments, disclosed is a method of operating an antenna system including dynamically tuning a tunable medium as a function of a determined channel matrix, wherein dynamically tuning a tunable medium as a function of a determined channel matrix includes tuning the tunable medium such that a precoder matrix of the tunable medium multiplied by the determined channel matrix produces a matrix that is approximately equal to a diagonal matrix.

In some embodiments, disclosed is a method of operating an antenna system including dynamically tuning a tunable medium as a function of a determined channel matrix, wherein dynamically tuning the tunable medium as a function of the determined channel matrix includes tuning the tunable medium such that the determined channel matrix multiplied by a decoder matrix of the tunable medium produces a matrix that is approximately equal to a diagonal matrix.

In some embodiments, disclosed is a method of operating an antenna system including dynamically tuning a tunable medium as a function of a determined channel matrix, wherein dynamically tuning a tunable medium as a function of a determined channel matrix includes tuning the tunable medium such that a precoder matrix of the tunable medium multiplied by the determined channel matrix produces a matrix having off-diagonal elements, wherein a magnitude of each of the off-diagonal elements is less than or equal to a predetermined threshold value.

In some embodiments, disclosed is a method of operating an antenna system including dynamically tuning a tunable medium as a function of a determined channel matrix, wherein dynamically tuning the tunable medium as a function of the determined channel matrix includes tuning the tunable medium such that the determined channel matrix multiplied by a decoder matrix of the tunable medium produces a matrix having off-diagonal elements, wherein a magnitude of each of the off-diagonal elements is less than or equal to a predetermined threshold value.

In some embodiments, disclosed is a method of operating an antenna system including dynamically tuning a tunable medium as a function of a determined channel matrix, wherein dynamically tuning a tunable medium as a function of a determined channel matrix includes tuning the tunable medium such that a matrix product between a precoder matrix of the tunable medium and the determined channel matrix multiplied by a decoder matrix of a far-end decoder is approximately equal to a diagonal matrix.

In some embodiments, disclosed is a method of operating an antenna system including dynamically tuning a tunable medium as a function of a determined channel matrix, wherein dynamically tuning a tunable medium as a function of the determined channel matrix includes tuning the tunable medium such that a matrix product between a precoder matrix of a far-end precoder and the determined channel matrix multiplied by a decoder matrix of the tunable medium is approximately equal to a diagonal matrix.

In some embodiments, disclosed is a method of operating an antenna system including dynamically tuning a tunable medium as a function of a determined channel matrix, wherein dynamically tuning a tunable medium as a function of a determined channel matrix includes tuning the tunable medium such that a matrix product between a precoder matrix of the tunable medium and the determined channel matrix multiplied by a decoder matrix of a far-end decoder results in a matrix having off-diagonal elements, wherein a magnitude of each of the off-diagonal elements is less than or equal to a predetermined threshold value.

In some embodiments, disclosed is a method of operating an antenna system including dynamically tuning a tunable medium as a function of a determined channel matrix, wherein dynamically tuning a tunable medium as a function of a determined channel matrix includes tuning the tunable medium such that a matrix product between a precoder matrix of a far-end precoder and the determined channel matrix multiplied by a decoder matrix of the tunable medium results in a matrix having off-diagonal elements, wherein a magnitude of each of the off-diagonal elements is less than or equal to a predetermined threshold value.

FIG. 1 is a simplified block diagram of an antenna system 100 including a plurality of near-end electromagnetic (EM) radiating elements 102-1, 102-2, 102-3, . . . 102-N (sometimes referred to herein generally together as "near-end EM radiating elements" 102, and individually as "near-end EM radiating element" 102) located at a near-end location, and a plurality of far-end EM radiating elements 104-1, 104-2, 104-3, . . . 104-M (sometimes referred to herein generally together as "far-end EM radiating elements" 104, and individually as "far-end EM radiating element" 104) located at one or more far-end locations.

The antenna system 100 also includes a tunable medium 200, and control circuitry 110 operably coupled to the tunable medium 200 and at least a portion of the near-end EM radiating elements 102 (e.g., some of the near-end EM radiating elements may function as reflectors instead of radiators, in some instances). The tunable medium 200 is positioned relative to the near-end EM radiating elements 102 and the far-end EM radiating elements 104 to scatter EM radiation 106 transmitted between the near-end EM radiating elements 102 and the far-end EM radiating elements 104. The control circuitry 110 includes a controller 112 programmed to modify EM properties of the tunable medium 200 to modify the EM radiation 106 transmitted between the near-end EM radiating elements 102 and the far-end EM radiating elements 104.

In some embodiments, the controller 112 is programmed to dynamically (e.g., on the order of a fraction of minutes) modify the EM properties of the tunable medium 200 to dynamically modify the EM radiation 106 transmitted between the near-end EM radiating elements 102 and the far-end EM radiating elements 104 during operation of the antenna system 100. In some embodiments, the controller 112 is programmed to pre-select a state of the tunable medium 200 and hold the tunable medium 200 in the pre-selected state during operation of the antenna system 100. Regardless of whether the controller 112 is programmed to dynamically modify or pre-select the EM properties of the tunable medium 200, the tunable medium 200 may function as a linear coder. When the near-end EM radiating elements 102 function as transmitting EM radiating elements, the tunable medium 200 may function as a linear precoder. Also, when the near-end EM radiating elements 102 function as receiving EM radiating elements, the tunable medium 200 may function as a linear decoder.

The controller 112 may be programmed to control the tunable medium 200. For example, the controller 112 may be programmed to control the tunable medium 200 to function as a linear beamforming coder, a linear spatial-diversity coder, a linear spatial multiplexing coder, or combinations thereof. Also, the controller 112 may be programmed to function as a precoder (e.g., while the near-end EM radiating elements 102 are transmitting), a decoder (e.g., while the near-end EM radiating elements 102 are receiving), or a combination thereof.

The control circuitry 110 may also include signal generation circuitry 114 operably coupled to the near-end EM radiating elements 102. The signal generation circuitry 114 is configured to deliver EM signals including data streams to the near-end EM radiating elements 102 for transmission to the far-end EM radiating elements 104.

The control circuitry 110 may further include signal processing circuitry 116 operably coupled to the near-end EM radiating elements 102. The signal processing circuitry 116 is configured to receive EM signals including data streams from the far-end EM radiating elements 104 through the near-end EM radiating elements 102.

The disclosure contemplates various arrangements of the near-end EM radiating elements 102 and the far-end EM radiating elements 104. By way of non-limiting example, the far-end EM radiating elements 104 may be distributed among at least two physically separate devices (e.g., a plurality of different mobile devices) (e.g., one far-end EM radiating element 104 per device, more than one far-end EM radiating element 104 per device, or combinations thereof). Also by way of non-limiting example, the far-end EM radiating elements 104 may all be included in the same physical device. Similarly, the near-end EM radiating elements 102 may be distributed among at least two physically separate devices, or may all be included in the same physical device (with one or more tunable media 200).

In some embodiments, a number of the data streams is equal to a number of the far-end EM radiating elements 104, and each of the far-end EM radiating elements 104 receives only one of the data streams. Also, in some embodiments, the number of the data streams is less than the number of the far-end EM radiating elements 104. Furthermore, in some embodiments, a number of the near-end EM radiating elements 102 is equal to the number of the data streams. Moreover, in some embodiments, the number of the near-end EM radiating elements 102 is greater than a number of the data streams.

Figure 2:
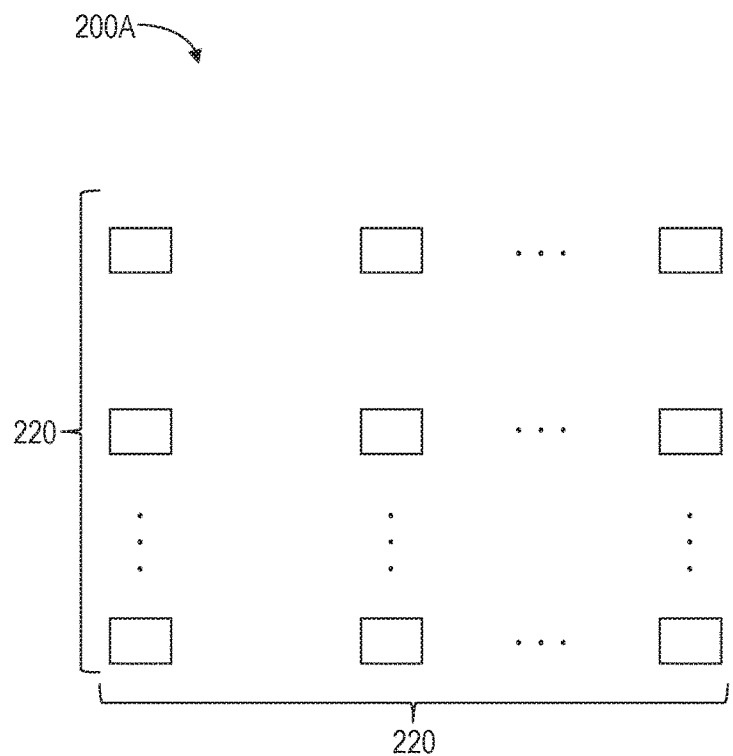
FIG. 2 is a simplified view of a segment of an example of a tunable medium of the antenna system of FIG. 1.

FIG. 2 is a simplified view of a segment 200A of an example of the tunable medium 200 of FIG. 1. In this example, the tunable medium 200 includes a tunable metamaterial including a plurality of tunable EM scattering elements 220 (hereinafter "tunable EM scattering elements" 220), as shown in the segment 200A. As used herein, the term "metamaterial" refers to a tunable medium including EM scattering elements spaced at sub-wavelength dimensions of an operational frequency of associated EM radiating elements. By way of non-limiting example, the plurality of tunable EM scattering elements 220 may include short dipoles, resonant dipoles, magnetic dipoles, other elements, and combinations thereof. In the example shown in FIG. 2, the tunable EM scattering elements 220 are arranged uniformly apart in a two-dimensional arrangement. It is contemplated, however, in the scope of the disclosure that one-dimensional or even three-dimensional arrangements of the tunable EM scattering elements 220 may be used. Furthermore, it is contemplated that uniform and non-uniform arrangements may be used in conjunction with any number of spatial dimensions.

In some embodiments, at least one of the tunable EM scattering elements 220 includes a tunable-impedance two-port lumped circuit element. In such embodiments, an expanded S-matrix approach may be used to account for mutual coupling between the tunable EM scattering elements 220, and reduce computational complexity. In some embodiments, at least one of the tunable EM scattering elements 220 includes a tunable capacitive element (e.g., a diode, a transistor, a variable dielectric constant material, a liquid crystal, etc.). In some embodiments, at least one of the tunable EM scattering elements 220 includes a variable resistive element (e.g., a diode, a transistor, etc.). In some embodiments, at least one of the tunable EM scattering elements 220 includes a variable inductance element.

In order to implement demultiplexing, off-diagonal elements of a product between a precoder matrix A, a channel matrix H, and a decoder (if any) matrix B may be decreased below a predetermined interference tolerance, cancelled, or a combination thereof. There may be $N_{od}=D(D-1)/2$ of such off-diagonal elements.

Minimization (e.g., cancellation) of these off-diagonal elements of AHB (B=I where there is no decoder) may be achieved by applying one or more tunable media 200 (e.g., metamaterial) layers with a total of $N_v \geq N_{od}$ degrees of freedom. For example, one layer with $N_1$ degrees of freedom may be applied as a precoder and another with $N_2$ degrees of freedom may be applied as a decoder, where $N_1+N_2=N_v$. As a specific, non-limiting example, only one layer with $N_v$ degrees of freedom may be applied at the near-end EM radiating elements 102 (FIG. 1). In some embodiments, however, any number of intermediate layers may be used in the antenna system 100 (FIG. 1), with demultiplexing distributed among the various layers. In embodiments where demultiplexing is performed using the tunable medium 200, a minimum number $N_v$ of degrees of freedom to achieve demultiplexing may scale quadratically with the number of data streams D.

Referring once again to FIG. 1, various configurations of the tunable medium 200 are contemplated. In some embodiments, a tunable medium 200 embodied in a single physical body may be used. In some embodiments, the tunable medium 200 may be divided into more than one physical body (e.g., spread across spread-out near-end EM radiating elements 102, positioned so that the EM radiation 106 passes through multiple tunable media 200, etc.). In some embodiments, the tunable medium 200 is located in front of the near-end EM radiating elements 102 with a front side of the near-end EM radiating elements 102 facing generally towards the plurality of the far-end EM radiating elements 104.

In some embodiments, the near-end EM radiating elements 102 may function as transmitters. By way of non-limiting example, the controller 112 may be programmed to control the tunable medium 200 to scatter the EM radiation 106 transmitted by the near-end EM scattering elements 102 at least substantially in a forward direction relative to the plurality of near-end EM radiating elements 102 (forward transmission mode). As used herein, the term "at least substantially in a forward direction" refers to directions within about 10 degrees of a front surface of a body carrying the near-end EM radiating elements 102. Also by way of non-limiting example, the controller 112 may be programmed to control the tunable medium 200 to scatter the EM radiation 106 at least substantially in a backward direction relative to the near-end EM radiating elements 102 (reflective backer mode). As used herein, the term "at least substantially in a backward direction" refers to a direction about 180 degrees from the at least substantially forward direction. As another non-limiting example, the controller 112 may be programmed to control the tunable medium 200 to scatter the EM radiation 106 at least substantially (i.e., within about 10 degrees) in a direction of a specular reflection relative to a surface of the body carrying the plurality of near-end EM radiating elements 102 (specular reflector at an arbitrary position). As a further, non-limiting example, the controller 112 may be programmed to control the tunable medium 200 to scatter the EM radiation 106 at least substantially (i.e., within about 10 degrees) in a direction towards the far-end EM radiating elements 104 (arbitrary-angle reflector, arbitrary position). Accordingly, the controller 112 may be programmed to operate the tunable medium 200 in "transmission" mode, but may also be programmed to operate the tunable medium 200 in "reflection" mode or "non-specular reflection" mode.

In some embodiments, the tunable medium 200 at least partially surrounds at least a portion of the near-end EM radiating elements 102. By way of non-limiting example, the tunable medium 200 may include a tunable radome including the tunable medium 200.

Figure 3:
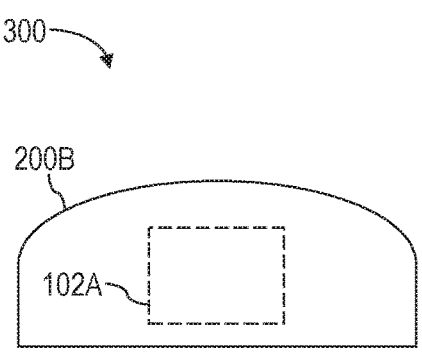
FIG. 3 illustrates a simplified view of a tunable radome.

FIG. 3 illustrates a simplified view of a tunable radome 300. The tunable radome 300 includes a tunable medium 200B at least partially surrounding near-end EM radiating elements 102A. In some embodiments, only a portion of the tunable radome 300 may include the tunable medium 200B. In some embodiments, however, at least substantially all (e.g., all) of the tunable radome 300 may be made of the tunable medium 200B.

Referring once again to FIG. 1, in some embodiments, the controller 112 may be programmed to determine (e.g., dynamically for a dynamic channel, statically for a static channel) a channel matrix H of channels between the near-end EM radiating elements 102 and the far-end EM radiating elements 104 (neglecting effects of the tunable medium 200), and tune (e.g., dynamically) the tunable medium 200 as a function of the determined channel matrix H. In some embodiments, the channel matrix H may be determined by at least one of transmitting and receiving one or more training signals, and analyzing received signal strength indicators (RSSIs) corresponding to the training signals. In some embodiments, the channel matrix may be determined at the far-end, and information including the channel matrix may be received by the control circuitry 110. In some embodiments, the control circuitry 110 may store (e.g., in data storage) information indicating past determined channel matrices, and select one of the past determined channel matrices for current use.

While the near-end EM radiating elements 102 are transmitting, the channel matrix H may include an N by M complex matrix (where N is a number of the near-end EM radiating elements 102 and M is the number of the far-end EM radiating elements 104), and each element $h_{ab}$ including a fading coefficient of a channel from an $a^{th}$ near-end EM radiating element 102 to a $b^{th}$ far-end EM radiating element 104, neglecting effects of the tunable medium 200. The channel matrix H describes linear relationships between the currents on transmitting EM radiating elements (e.g., the near-end EM radiating elements 102) and receiving EM radiating elements (e.g., the far-end EM radiating elements 104). The channel matrix H is a discrete form of the Green's function of the channel. If the transmit and receive EM radiating elements are viewed as input and output ports, respectively, the channel matrix H is also the same as the S-parameter matrix of a port network. In other words, a matrix product of a vector of near-end transmit signals X and the channel matrix H plus any noise W produces a vector of far-end receive signals Y, or equivalently Y=XH+W, again, neglecting the tunable medium 200.

The tunable medium 200 provides the ability to precode the transmit signals X. Specifically, the tunable medium 200 may be tuned to modify the receive signals Y received at the far-end EM radiating elements 104. For example, the receive signals Y may be expressed as a product of transmit signals X and a precoder matrix A of the tunable medium 200 multiplied by the channel matrix H, plus any noise W, or Y=XAH+W. As another example, the receive signals Y may be expressed as a product of transmit signals X, a precoder matrix A of the tunable medium 200, the channel matrix H, and a decoder matrix B of a tunable medium 200 at the far-end (not shown), plus any noise W, or Y=XAHB+W. The product of the channel matrix H with any coder matrices (A, B, or a combination thereof) may be referred to herein as an "extended channel matrix" (e.g., AH, AHB), or H'.

In some embodiments, the controller 112 may be programmed to determine control parameters of the tunable medium 200 that result in approximately a desired extended channel matrix H'. By way of non-limiting example, the control parameters may be determined by solving an inverse scattering problem, with the inverse scattering problem postulated as an equality between a determined extended channel matrix $H'^{DET}$ and a desired extended channel matrix $H'^{GOAL}$ ($H'^{DET}=H'^{GOAL}$). For example, in some embodiments, the inverse scattering problem may be postulated as a minimization problem for the matrix norm of the difference between determined channel matrix $H'^{DET}$ and the desired extended channel matrix $H'^{GOAL}$ ($\min\|H'^{DET}-H'^{GOAL}\|$, $\min\|H'^{GOAL}-H'^{DET}\|$, etc.). In some embodiments, the inverse scattering problem may be postulated as a least-squares problem with a minimization goal represented as a sum of squared differences between selected components (e.g., all the components, a portion of the components, etc.) of the determined extended channel matrix $H'^{DET}$ and corresponding components of the desired extended channel matrix $H'^{GOAL}$, or $\min_{\vec{p}} \Sigma_{(i,j)} |H'^{DET}_{ij}(\vec{p}) - H'^{GOAL}_{ij}|^2$. In some embodiments, the inverse scattering problem may be postulated as a least-squares problem with a minimization goal represented as a sum of squared differences between selected components (e.g., all the components, a portion of the components, etc.) of the determined extended channel matrix $H'^{DET}$ and corresponding components of the desired extended channel matrix $H'^{GOAL}$ plus a weighted sum of frequency dispersion magnitudes of the selected components, or:

$$\min_{\vec{p}} \sum_{(i,j)} \left\{ |H'^{DET}_{ij}(\vec{p}) - H'^{GOAL}_{ij}|^2 + w_{ij} \left| f_0 \left( \frac{\partial H'^{DET}_{ij}(\vec{p}, f)}{\partial f} \right)_{f=f_0} \right|^2 \right\},$$

where $f_0$ is a central frequency of an operation frequency band, and $w_{ij}$ are non-negative weights. The inclusion of the weighted sum of frequency dispersion magnitudes may be used to increase instantaneous bandwidth of the solution.

The tuning problem may be solved as an optimization problem with a number of variables equal to a number of degrees of freedom of the tunable medium 200. In some embodiments, an optimization function (e.g., minimizing a norm of a difference between a desired extended channel matrix and an observed extended channel matrix) may be defined as a sum of squares of off-diagonal elements of the determined extended channel matrix. As a specific, non-limiting example where there is a precoder but no decoder, the extended channel matrix may be AH. In this example, the tuning algorithm may become essentially a form of the zero forcing algorithm, except that the precoder is implemented with a scattering/diffractive medium (i.e., the tunable medium 200) applied inside of the propagation channel as opposed to a circuit-based precoder applied to the signals before they enter the near-end EM radiating elements 102. This is essentially a generalization of a multiple-null steering approach to interference cancellation. For example, the $i^{th}$ near-end EM radiating element 102 may be surrounded by a null-forming adaptive layer of the tunable medium 200 that creates nulls at the location of each of the far-end EM radiating elements 104 except the $i^{th}$ far-end EM radiating element 104 that is intended to receive the signal from the $i^{th}$ near-end EM radiating element 102.

It should be noted that although the tunable medium 200 is discussed herein as implementing a coder, the tunable medium 200 may be equivalently thought of as a coded aperture, and the near-end EM radiating elements 102 may be equivalently regarded as corresponding wireless feeds for the coded aperture. Accordingly, the disclosure contemplates that any of the embodiments discussed herein may be equivalently regarded in terms of the tunable medium 200 functioning as a coder and a coded aperture.

Figure 4:
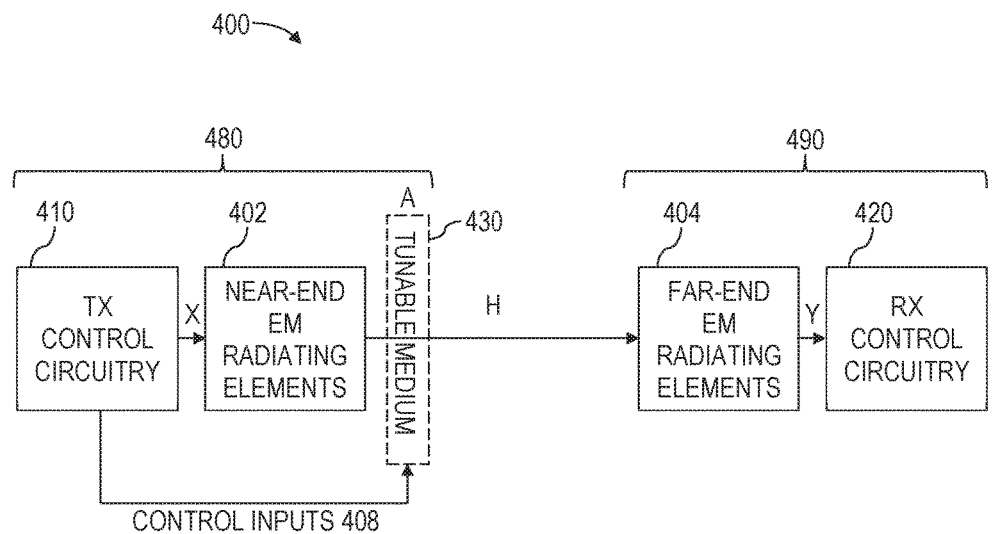
FIG. 4 is a simplified block diagram of an example of a system.

FIG. 4 is a simplified block diagram of an example of a system 400 including near-end equipment 480 and far-end equipment 490. In this example, the near-end equipment 480 includes transmit control circuitry 410 operably coupled to near-end EM radiating elements 402, and a tunable medium 430. The transmit control circuitry 410 may be similar to the control circuitry 110 of FIG. 1, including at least signal generation circuitry configured to generate transmit signals X and a controller configured to tune the tunable medium 430 (e.g., using control inputs 408). The far-end equipment 490 includes far-end EM radiating elements 404 operably coupled to receive control circuitry 420, including at least signal processing circuitry similar to the signal processing circuitry 116 of FIG. 1.

In some embodiments, the transmit control circuitry 410 may be programmed to tune the tunable medium 430 such that the product of a precoder matrix A of the tunable medium 430 and the channel matrix H is at least approximately equal to a diagonal matrix (e.g., by solving the inverse scattering problem using any of the approaches discussed above). The resulting receive signals Y would be given by XAH+W, which is approximately equal to a diagonal matrix, assuming that W is relatively small. In other words, the transmit control circuitry 410 may be programmed such that the product of the precoder matrix A and the channel matrix H produces a matrix having off-diagonal elements, each of the off-diagonal elements having a magnitude less than or equal to a predetermined threshold value. In such embodiments, each element of the transmit signals X will be communicated to only one of the far-end EM radiating elements 404. Stated another way, the tunable medium 430 may act as a lens altering radiation patterns of the near-end EM radiating elements 402 to include peaks to one of the far-end EM radiating elements 404, and nulls to the others of the far-end EM radiating elements 404. As a result, the tunable medium 430 may function as a spatial multiplexing precoder.

As a specific, non-limiting example of how this spatial multiplexing precoder may be implemented, the transmit control circuitry 410 may be programmed such that the precoder matrix A of the tunable medium 430 is at least approximately equal to a left pseudo-inverse of the channel matrix H (e.g., by solving the inverse scattering problem using any of the approaches discussed above). In such embodiments, the matrix product of the precoder matrix A and the channel matrix H is approximately equal to an identity matrix (i.e., the numbers in the main diagonal are ones, and the off-diagonal elements are zeros). A similar result may be obtained if the transmit control circuitry 410 is programmed to tune the tunable medium 430 such that the precoder matrix A is the matrix inverse of the channel matrix H (assuming that H is square and non-singular).

Figure 5:
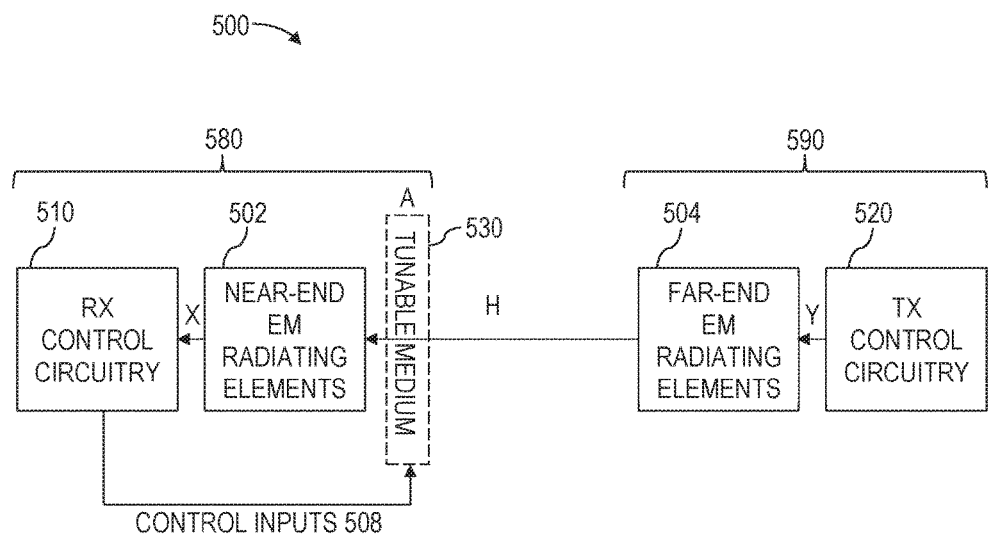
FIG. 5 is a simplified block diagram of another example of a system.

FIG. 5 is a simplified block diagram of another example of a system 500 including near-end equipment 580 and far-end equipment 590. The system 500 of FIG. 5 is similar to the system 400 of FIG. 4 except that the near-end equipment 580 is configured to receive communications from the far-end equipment 590 (i.e., the near-end equipment is functioning as a receiver and the far-end equipment is functioning as a transmitter). The near-end equipment 580 includes receive control circuitry 510 operably coupled to near-end EM radiating elements 502 and a tunable medium 530. The receive control circuitry 510 includes at least signal processing circuitry operably configured to receive signals X from the near-end EM radiating elements 502, and a controller configured to tune the tunable medium 530 (e.g., using control inputs 508). The far-end equipment 590 may include far-end EM radiating elements 504 operably coupled to transmit control circuitry 520 including at least signal generation circuitry.

While the near-end EM radiating elements 502 are receiving, the channel matrix H may include an M by N complex matrix, and each element $h_{ba}$ may include a fading coefficient of a channel from a $b^{th}$ far-end EM radiating element 504 to an $a^{th}$ near-end EM radiating element 502. In other words, a matrix product of a vector of far-end transmit signals Y transmitted by the far-end EM radiating elements 504 and the channel matrix H plus any noise W produces a vector of near-end receive signals X received by the near-end EM radiating elements 502, or equivalently X=YH+W.

The tunable medium 530 provides the ability to decode the receive signals X. Specifically, the tunable medium 530 may be tuned to modify the receive signals X received at the near-end EM radiating elements 502. For example, the receive signals X may be expressed as the product of transmit signals Y and the channel matrix H multiplied by a decoder matrix A of the tunable medium 530, plus any noise W, or X=YHA+W. Accordingly, the extended channel matrix H' may be expressed as HA in such instances.

In some embodiments, the receive control circuitry 510 may be programmed to tune the tunable medium 530 such that the product of the channel matrix H and the decoder matrix A of the tunable medium 530 is at least approximately equal to a diagonal matrix (e.g., by solving the inverse scattering problem using any of the approaches discussed above). The resulting receive signals X would be given by YHA+W, which is approximately equal to a diagonal matrix, assuming that W is relatively small. In other words, the receive control circuitry 510 may be programmed such that the product of the channel matrix H and the precoder matrix A produces a matrix having off-diagonal elements, each of the off-diagonal elements having a magnitude that is less than or equal to a predetermined threshold value. In such embodiments, each element of the transmit signals Y will be communicated to only one of the near-end EM radiating elements 502. Stated another way, the tunable medium 530 may act as a lens altering receive radiation patterns of the near-end EM radiating elements 502 to include peaks to one of the far-end EM radiating elements 504, and nulls to the others of the far-end EM radiating elements 504. As a result, the tunable medium 530 may function as a spatial multiplexing decoder.

As a specific, non-limiting example of how this spatial multiplexing decoder may be implemented, the receive control circuitry 510 may be programmed such that the decoder matrix A of the tunable medium 530 is at least approximately equal to a right pseudo-inverse of the channel matrix H (e.g., by solving the inverse scattering problem using any of the approaches discussed above). In such embodiments, the matrix product of the channel matrix H and the decoder matrix A is approximately equal to an identity matrix (i.e., the numbers in the main diagonal are ones, and the off-diagonal elements are zeros). A similar result may be obtained if the receive control circuitry 510 is programmed to tune the tunable medium 530 such that the decoder matrix A is the matrix inverse of the channel matrix H (assuming that H is square and non-singular).

Figure 6:
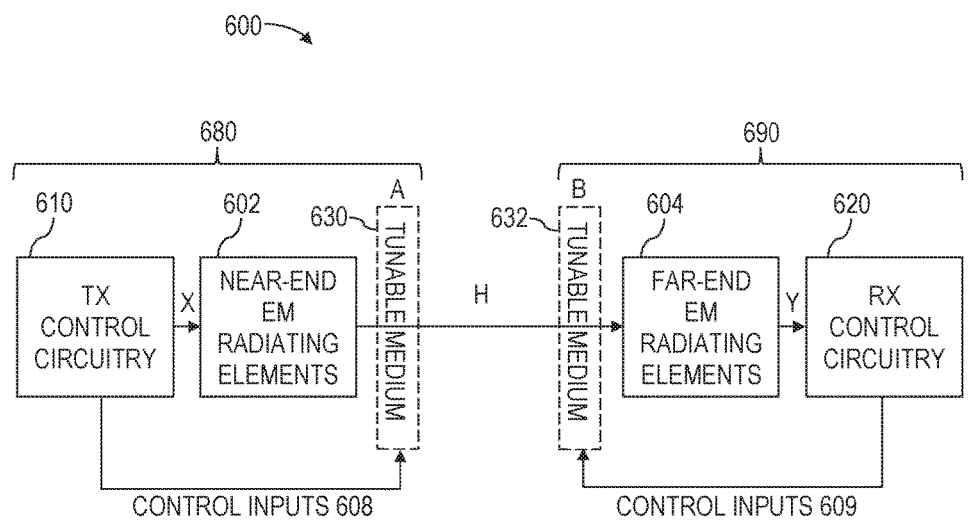
FIG. 6 is a simplified block diagram of another example of a system.

In some embodiments, tunable media such as the tunable medium 200 discussed with reference to FIG. 1 may be included in both near-end equipment and far-end equipment. FIG. 6 illustrates an example of such a system.

FIG. 6 is a simplified block diagram of another example of a system 600 including near-end equipment 680 and far-end equipment 690. The near-end equipment 680 includes transmit control circuitry 610 operably coupled to near-end EM radiating elements 602 and a tunable medium 630. The transmit control circuitry 610 is programmed to provide transmit signals X to the near-end EM radiating elements 602, and tune the tunable medium 630 (e.g., using control inputs 608). The transmit control circuitry 610, the near-end EM radiating elements 602, and the tunable medium 630 may be similar to the control circuitry 110, the near-end EM radiating elements 102, and the tunable medium 200, respectively, as discussed above with reference to FIG. 1.

The far-end equipment 690 includes receive control circuitry 620 operably coupled to far-end EM radiating elements 604 and a tunable medium 632. The far-end EM radiating elements 604 are configured to deliver receive signals Y resulting from transmit signals X at the near-end EM radiating elements 602 to the receive control circuitry 620. The receive control circuitry 620 is configured to receive the receive signals X, and tune the tunable medium 632 (e.g., using control inputs 609). The receive control circuitry 620, the far-end EM radiating elements 604, and the tunable medium 632 may be similar to the control circuitry 110, the near-end EM radiating elements 102, and the tunable medium 200, respectively, as discussed above with reference to FIG. 1.

The receive signal Y received by the receive control circuitry 620 may be expressed as Y=XAHB+W, where X is the transmit signal, A is a precoder matrix of the tunable medium 630, H is the channel matrix, B is a decoder matrix of the tunable medium 632, and W is any noise. Coding (e.g., precoding, decoding) may be performed at the near-end equipment 680, the far-end equipment 690, or a combination thereof. Accordingly, the extended channel matrix H' may be expressed as AHB in such instances.

In some embodiments, the transmit control circuitry 610 and the receive control circuitry 620 may be programmed to tune the tunable media 630, 632, respectively, such that the matrix product AHB is at least approximately equal to a diagonal matrix (e.g., by solving the inverse scattering problem using any of the approaches discussed above). The resulting receive signals Y would be given by XAHB+W, which is approximately equal to a diagonal matrix, assuming that W is relatively small. In other words, the off-diagonal elements of the matrix product AHB produce a matrix having off-diagonal elements, each of the off-diagonal elements having a magnitude that is less than or equal to a predetermined threshold value. In such embodiments, each element of the transmit signals X will be communicated to only one of the far-end EM radiating elements 604. Stated another way, the tunable media 630, 632 may act as lenses altering radiation patterns of the near-end EM radiating elements 602 and the far-end EM radiating elements 604 to include peaks and nulls configured to implement spatial multiplexing coders. As a result, the tunable media 630, 632 may function as spatial multiplexing coders.

As a specific, non-limiting example of how this spatial multiplexing coding may be implemented, the transmit control circuitry 610 may be programmed such that a precoder matrix of the tunable medium 630 is at least approximately equal to $U^\dagger$, where $U\Sigma V^\dagger$ is a singular value decomposition of the channel matrix H, and $U^\dagger$ is the conjugate transpose of unitary matrix U (e.g., by solving the inverse scattering problem using any of the approaches discussed above). Also, the receive control circuitry 620 may be programmed such that the decoder matrix B of the tunable medium 632 is at least approximately equal to V, where V is the conjugate transpose of $V^\dagger$. In such embodiments, the matrix product of the precoder matrix A, the channel matrix H, and the decoder matrix B is approximately equal to a diagonal matrix (i.e., the numbers in the main diagonal are the singular values of the channel matrix H, and the off-diagonal elements are zeros) (e.g., by solving the inverse scattering problem using any of the approaches discussed above). A similar result (except that the diagonal elements of AHB are the eigenvalues of the channel matrix H instead of the singular values) may be obtained if the transmit control circuitry 610 tunes the tunable medium 630 such that the precoder matrix A is approximately equal to $Q^{-1}$, and the receive control circuitry 620 tunes the tunable medium 632 such that the decoder matrix B is approximately equal to Q, where $Q\Lambda Q^{-1}$ is the eigenvalue decomposition of the channel matrix H (assuming that H is a diagonizable matrix), and $Q^{-1}$ is the matrix inverse of the matrix Q.

Of course, the designation of the near-end equipment 680 and the far-end equipment 690 as near-end and far-end, respectively, is merely relative. From the perspective of the far-end equipment 690, the near-end equipment 680 would be far-end equipment, and the far-end equipment 680 would be near-end equipment.

In some embodiments where data streams are transmitted from the near-end equipment 680 to the far-end equipment 690, there may be a number D of data streams, $N_t$ near-end EM radiating elements 602 ($N_t \geq D$), and $N_r$ far-end EM radiating elements 604. As previously discussed, the $N_r$ far-end EM radiating elements 604 may be collocated within a single device, or distributed arbitrarily between any number $N_u$ of users (e.g., separate physical devices), where $1 \leq N_u \leq N_r$. In such embodiments, the a precoder matrix A of the tunable medium 630 is of size D-by-$N_t$, the channel matrix H is $N_t$-by-$N_r$, and the decoder matrix B is $N_r$-by-D. In such instances, the full demultiplexed matrix AHB is a square, Hermitian matrix of size D-by-D. This matrix is automatically symmetric because the combination of the original propagation channel H and the two coding tunable media 630, 632 may itself be viewed as a propagation channel AHB. Assuming that this channel is reciprocal leads to the conclusion that the combined channel matrix AHB is Hermitian.

In embodiments disclosed herein, the tunable medium 630 functioning as a precoder may be placed between the $N_t$ near-end EM radiating elements 602 and the propagation channel, and the tunable medium 632 functioning as a decoder may be placed between the $N_r$ far-end EM radiating elements 604 and the propagation channel. In some such embodiments, the number of data steams D may match the number of far-end EM radiating elements 604 receiving the data streams. Moreover, in some embodiments, $N_t = N_r = D$. In some embodiments, the number of near-end EM radiating elements 602 may vary dynamically (e.g., as the number $N_r$ receiving far-end EM radiating elements 604 dynamically changes).

Figure 7:
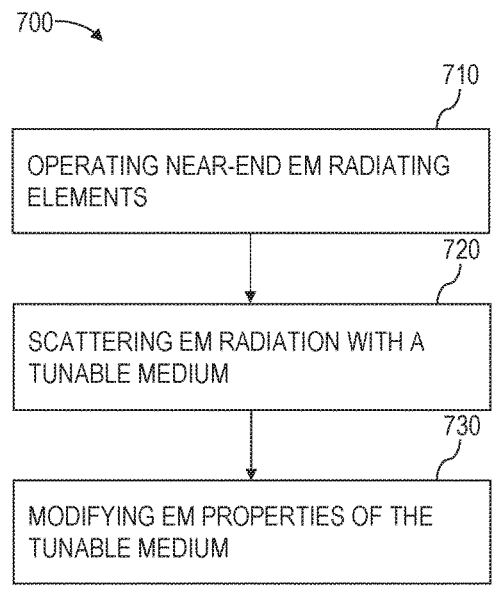
FIG. 7 is a simplified flow chart illustrating a method of operating an antenna system.

FIG. 7 is a simplified flow chart illustrating a method 700 of operating an antenna system, such as the antenna system 100 illustrated in FIG. 1. Referring to FIGS. 1 and 7 together, the method 700 includes operating 710 near-end EM radiating elements 102. In some embodiments, operating 710 near-end EM radiating elements 102 includes delivering EM signals including a plurality of different data streams to the near-end EM radiating elements 102 for transmission to the far-end EM radiating elements 104 (e.g., using the same or similar carrier frequency for each of the plurality of different data streams). In some embodiments, operating 710 near-end EM radiating elements 102 includes receiving EM signals including a plurality of different data streams from the far-end EM radiating elements 104 through the near-end EM radiating elements 102.

The method 700 also includes scattering 720 the EM radiation 106 transmitted between the near-end EM radiating elements 102 and the far-end EM radiating elements 104 with a tunable medium 200.

The method 700 further includes modifying 730 EM properties of the tunable medium 200 to modify the EM radiation 106 transmitted between the near-end EM radiating elements 102 and the far-end EM radiating elements 104. In some embodiments, modifying 730 EM properties of the tunable medium 200 includes dynamically modifying the EM properties of the tunable medium 200 during operation of the antenna system 100. In some embodiments, modifying 730 EM properties of the tunable medium 200 includes pre-selecting a state of the tunable medium 200 and holding the tunable medium 200 in the selected state during operation of the antenna system 100.

Figure 8:
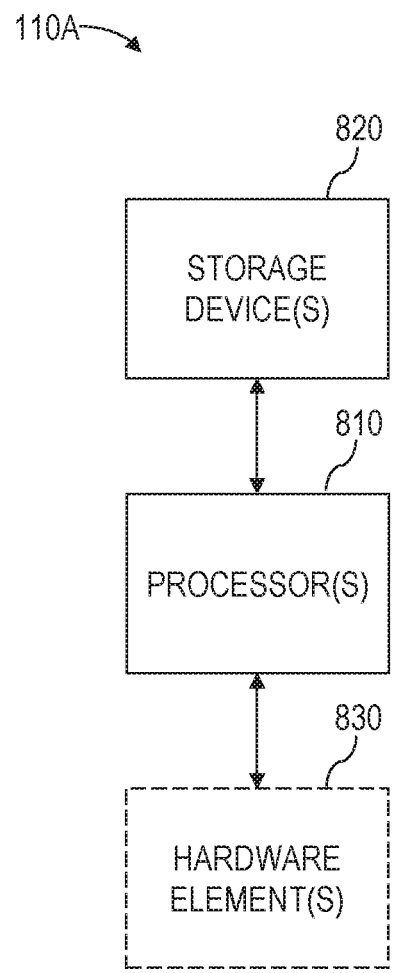
FIG. 8 is a simplified block diagram of example control circuitry of the antenna system of FIG. 1.

FIG. 8 is a simplified block diagram of example control circuitry 110A (hereinafter "control circuitry" 110A) of control circuitry 110 of the antenna system 100 of FIG. 1. The control circuitry 110A may include at least one processor 810 (hereinafter referred to simply as "processor" 810) operably coupled to at least one data storage device 820 (hereinafter referred to simply as "storage" 820). The storage 820 may include at least one non-transitory computer-readable medium. By way of non-limiting example, the storage 820 may include one or more volatile data storage devices (e.g., Random Access Memory (RAM)), one or more non-volatile data storage devices (e.g., Flash, Electrically Programmable Read Only Memory (EPROM), a hard drive, a solid state drive, magnetic discs, optical discs, etc.), other data storage devices, and combinations thereof.

The storage 820 may also include data corresponding to computer-readable instructions stored thereon. The computer-readable instructions may be configured to instruct the processor 810 to execute at least a portion of the functions that the control circuitry 110 (FIG. 1) is configured to perform. By way of non-limiting example, the computer-readable instructions may be configured to instruct the processor 810 to execute at least a portion of the functions of at least one of the signal generation circuitry 114, the signal processing circuitry 116, and the controller 112 (e.g., at least a portion of the functions discussed with reference to the method 700 of FIG. 7) of FIG. 1. Also by way of non-limiting example, the computer-readable instructions may be configured to instruct the processor 810 to execute at least a portion of the functions of at least one of the transmit control circuitry 410 (FIG. 4), the receive control circuitry 420 (FIG. 4), the receive control circuitry 510 (FIG. 5), the transmit control circuitry 520 (FIG. 5), the transmit control circuitry 610 (FIG. 6), and the receive control circuitry 620 (FIG. 6).

The processor 810 may include a Central Processing Unit (CPU), a microcontroller, a Programmable Logic Controller (PLC), other programmable device, or combinations thereof. The processor 810 may be configured to execute the computer-readable instructions stored by the storage 820. By way of non-limiting example, the processor 810 may be configured to transfer the computer-readable instructions from non-volatile storage of the storage 820 to volatile storage of the storage 820 for execution. Also, in some embodiments, the processor 810 and at least a portion of the storage 820 may be integrated together into a single package (e.g., a microcontroller including internal storage, etc.). In some embodiments, the processor 810 and the storage 820 may be implemented in separate packages.

In some embodiments, the control circuitry 110A may also include at least one hardware element 830 (hereinafter referred to simply as "hardware element" 830). The hardware element 830 may be configured to perform at least a portion of the functions the control circuitry 110A is configured to perform. By way of non-limiting example, the hardware element 830 may be configured to perform at least a portion of the functions of at least one of the signal generation circuitry 114, the signal processing circuitry 116, and the controller 112 (e.g., at least a portion of the functions discussed with reference to the method 700 of FIG. 7) of FIG. 1. Also by way of non-limiting example, the hardware element 830 may be configured to instruct the processor 810 to execute at least a portion of the functions of at least one of the transmit control circuitry 410 (FIG. 4), the receive control circuitry 420 (FIG. 4), the receive control circuitry 510 (FIG. 5), the transmit control circuitry 520 (FIG. 5), the transmit control circuitry 610 (FIG. 6), and the receive control circuitry 620 (FIG. 6). In some embodiments, the hardware element 830 may include a System on Chip (SOC), an array of logic circuits configured to be programmably interfaced to perform functions of the control circuitry 110A (e.g., a Field Programmable Gate Array (FPGA)), an Application Specific Integrated Circuit (ASIC), other hardware elements, and combinations thereof.

Referring now to FIGS. 1 and 2, optimizing the tuning of the individual tunable EM scattering elements 220 or groups of tunable EM scattering elements 220 to attain a target coder may be done in a wide variety of manners. Many of these approaches, however, result in one or a small number of potential tuning solutions, without giving any assurance that any of these solutions represent the best solution (global optimum) and/or without providing any indication of how close to the global optimum the solution might be. Exhaustive computations using traditional methods may be too computationally intensive and/or infeasible for real-time tuning and for switching.

The complexity of the optimization problem may increase rapidly with the complexity of the device. In many embodiments, the complexity increases exponentially with the number of tunable EM scattering elements 220. Thus, standard optimization approaches for tuning an array of tunable EM scattering elements 220 may require cost functions to be evaluated a large number of times. The number of tunable EM scattering elements 220 of the antenna system 100 may be expressed as the degrees of freedom (DoF) of the antenna system 100. The DoF may be based on the number of tunable EM scattering elements 220, associated tunable elements, and/or other tunable or adjustable components associated with the antenna system 100. As the DoF increases, the complexity is likely to increase exponentially, leading to optimization problems for which global or even quasi-global solutions are prohibitively computationally expensive for even moderate device complexity.

The antenna systems and related methods disclosed herein provide optimization solutions for arrays of tunable EM scattering elements and associated tunable (i.e., variable) lumped impedance elements in which the optimization solutions are rational multivariate functions. Accordingly, globally optimal solutions may be found by solving optimization problems that scale linearly with the DoF instead of exponentially. The optimization approach can be simplified by making the cost function dependent on one matrix-value input (such as an impedance matrix, Z-Matrix) that can be calculated by performing no more than N linear system simulations. In the present application, N is an integer corresponding to the number of variable (e.g., tunable) impedance elements associated with an antenna system.

The cost function, although still non-linear, may have a specific rational form that permits exhaustive enumeration of all local extrema. A global maximum (or minimum) can be selected from the local extrema. For rational function, the extrema are found by solving multivariate polynomial equations. Root enumeration and/or numerical calculations of the multivariate polynomial equations may allow for specialized treatment.

Tunable metamaterials, including two-dimensional metasurface devices, may comprise an array of unit cells. Each unit cell may be modeled as a sub-wavelength antenna element associated with one or more variable impedance elements (e.g., the tunable EM scattering elements 220). Each variable impedance element may be associated with one or more sub-wavelength antenna elements. Each impedance element or group of impedance elements may be variably controlled based on one or more impedance control inputs. The tuning may be a one-time static tuning that is performed during the manufacturing of the antenna device, or the tuning may be a dynamic process that occurs during operation by modifying one or more control inputs.

As an example of static tunability, a metamaterial device may be manufactured using a 3D printer and the tuning may comprise selecting a material or combination of materials that results in a specific electromagnetic or electrical property for each of the impedance elements. By uniquely selecting the material or combination of materials for each of the unit cells, a metamaterial antenna device may be statically tuned to a specific radiation pattern. Alternatively, each unit cell may be modeled to include a lumped impedance element with (at least) one input and (at least) one output. The input(s) may be dynamically manipulated during operation to dynamically tune the antenna device in real-time to allow for a wide range of selectable target radiation patterns.

As previously described, the system may be modeled to include lumped impedance elements that can be passive, active, or variably passive-active. At a given frequency, each impedance element may be fully described by the complex value of its impedance "z." A positive integer N may be used to describe the number of tunable or variable lumped impedance elements in an antenna system. A diagonal square matrix of size N may have diagonal elements $z_n$ representative of the nth elements of the antenna system. Alternatively, an N-dimensional complex vector, $\{z_n\}$, can be used to represent the n-valued list of impedance values.

Each variable impedance element may be modeled as a port (e.g., a lumped port and/or a wave port). A plurality of lumped ports, N, may include a plurality of internal lumped ports, $N_a$, internal to the tunable medium 200 and with impedance values corresponding to the impedance values of each of the variable impedance elements, and at least one lumped external port (e.g., associated with the near-end EM radiating elements 102 and the far-end EM radiating elements 104), $N_e$, that may or may not have a variable impedance or any impedance at all. That is, the z value of the modeled lumped external port, $N_e$, may be zero and represent an idealized shorted port. Alternatively, the z value of the modeled lumped external port, $N_e$, may be infinity and represent an idealized open port. In many embodiments, the z value of the external port, $N_e$, may be a complex value with a magnitude between zero and infinity.

Regardless of the impedance values of each of the lumped ports, N, including the internal lumped ports, $N_a$, and the at least one lumped external port, $N_e$, each of the lumped ports (or in some embodiments wave ports) may have its own self-impedance and the network of ports may be described by an N x N impedance matrix (Z-Matrix) or by the equivalent inverse admittance matrix (Y-matrix) where $Y=Z^{-1}$. Additionally, the network of ports can be modeled as an S-parameter matrix or scattering matrix (S-matrix). The Z-matrix and its inverse the Y-matrix are independent from the specific z values of the ports because the matrix elements are defined as $Z_{nm}=V_n/I_m$, where $V_n$ and $I_m$ are the voltage at port n and the current at port m, measured with all other ports open. That is, assuming port currents $I_k=0$ for all k are not equal to m or n. Similarly, for the admittance matrix, $Y_{nm}=I_m/V_n$, measured with all other ports open. Again, that is assuming port currents $I_k=0$ for all k are not equal to m or n.

The S-matrix is expressible through the Z or Y matrices and the values of the lumped impedance elements as follows:

$$S=(\sqrt{y}Z\sqrt{y}-1)(\sqrt{y}Z\sqrt{y}+1)^{-1}=(1-\sqrt{z}Y\sqrt{z})(1+\sqrt{z}Y\sqrt{z})^{-1}$$

In the equation above, the "1" represents a unit matrix of size N. The S-matrix models the port-to-port transmission of off-diagonal elements of the N-port antenna system. In a lossless system, the S-matrix is necessarily unitary. If elements $s_n$ are the singular values of the S-matrix, which are the same as the magnitudes of the eigenvalues, it can be stated that in a lossless system, all $s_n=1$. In general, if $s_{max}$ is the largest singular value, then for a passive lossy system it can be stated that $s_n \le s_{max} \le 1$.

In an active system, these bounds still hold; however, $s_{max}$ can now exceed unity, representing an overall power gain for at least one propagation path. The Z and Y matrices are diagonalized in the same basis represented by a unitary matrix U ($U^\dagger=U^{-1}$), such that $Z=U^\dagger Z_d U$, $Y=U^\dagger Y_d U$, where the subscript d indicates a diagonal matrix, the elements of which are complex-valued eigenvalues of the corresponding matrix.

Generally speaking, unless $\sqrt{z}$ is proportional to a unit matrix (i.e., all lumped element impedances are equal), the S-matrix will not be diagonal in the U-basis. In the U-basis, the general form of the S-matrix is $S=U^\dagger(1-\zeta Y_d \zeta)(1+\zeta Y_d \zeta)^{-1}U$, where a new non-diagonal matrix $\zeta=U\sqrt{z}U^\dagger$ is used such that $\sqrt{z}=U^\dagger \zeta U$, and $Y_d$ is diagonal, though not generally commutative with $\zeta$.

The S-matrix of the system can be numerically evaluated with any desired accuracy by solving exactly N linear system problems (e.g., $Z_{nm}=V_n/I_m$ or $Y_{nm}=I_m/V_n$ and the associated open port conditions described above). Such problems may be solved with Finite Element Methods (FEM) or finite-difference time-domain (FDTD) based solvers for linear electromagnetic systems. Examples of commercially available solvers include ANSYS HFSS, COMSOL, and CST. These numerical simulations incorporate various fine effects of the near-field and far-field interactions between various parts of the system, regardless of complexity.

The Z-matrix and/or the Y-matrix can be evaluated based on a knowledge of the S-matrix and the impedance values. With many FEM solvers, it is also possible to directly evaluate the Z-matrix or the Y-matrix, by solving $N^2$ linear problems. This approach, however, is N times less efficient than calculating the S-matrix with a fixed set of port impedance values (known as reference impedance values) and transforming it to Z and/or Y.

In various embodiments, an antenna system (e.g., the antenna system 100) may include a plurality of sub-wavelength antenna elements (e.g., the tunable EM scattering elements 220). The sub-wavelength antenna elements may each have a maximum dimension that is less than half of a wavelength of the smallest frequency within an operating frequency range. One or more of the sub-wavelength antenna elements may comprise a resonating element. In various embodiments, some or all of the sub-wavelength antenna elements may comprise metamaterials. In other embodiments, an array of the sub-wavelength antenna elements (e.g., resonating elements) may be collectively considered a metamaterial.

The sub-wavelength antenna elements may have inter-element spacings that are substantially less than a free-space wavelength corresponding to an operating frequency or frequency range. For example, the inter-element spacings may be less than one-half or one-quarter of the free-space operating wavelength. The antenna system may be configured to operate in a wide variety of operating frequency ranges, including, but not limited to, microwave frequencies. The presently described systems and methods may be adapted for use with other frequency bands, including those designated as very low frequency, low frequency, medium frequency, high frequency, very high frequency, ultra-high frequency, super-high frequency, and extremely high frequency or millimeter waves.

In some embodiments, each of the sub-wavelength antenna elements is associated with at least one lumped impedance element. A common transmission line (TL) may be coupled to the sub-wavelength antenna elements via the lumped impedance elements. Alternative waveguides may be used instead of or in addition to TLs. Each lumped impedance element may have a variable impedance value that may be at least partially based on the connected sub-wavelength antenna element(s) and/or a connected TL or other waveguide(s). A waveguide or TL may be modeled as another port in the S-matrix in some embodiments, such as in Heretic-like architectures with variable couplers.

The impedance of each of the lumped impedance elements may be variably adjusted through one or more impedance control inputs. The number of sub-wavelength antenna elements, associated impedance elements, and the number of impedance control inputs may be a 1:1:1 ratio or an X:Y:Z, where X, Y, and Z are integers that may or may not be equal. For instance, in one embodiment there may be a 1:1 mapping of impedance elements to sub-wavelength antenna elements while there is only one-tenth the number of impedance control inputs.

In various embodiments, the modeled lumped external port, $N_e$, may or may not be associated with a variable impedance element. In some embodiments, the lumped external port, $N_e$, is modeled as an external port with an infinitesimal volume located at a particular radius-vector relative to the antenna device. The lumped external port, $N_e$, may be in the far-field of the antenna device, the radiative near-field of the antenna device, or the reactive near-field of the antenna device.

In some embodiments, the lumped external port, $N_e$, may comprise a virtual port, an external region of space assumed to be a void, a region of space assumed to be filled with a dielectric material, and/or a location in space assumed to be filled with a conductive, radiative, reactive, and/or reflective material. In at least some embodiments, the lumped external port, $N_e$, comprises a receiving antenna (e.g., the near-end EM radiating elements 102, the far-end EM radiating elements 104, etc.).

The lumped external port, $N_e$, may also be modeled as a virtual external port, comprises a field probe, as measured by a non-perturbing measurement. In other embodiments, the virtual external port may represent a numerical field probe, as calculated using a numerical simulation.

As previously described, in some embodiments, a unique lumped impedance element may be associated with each of the tunable EM scattering elements 220. In other embodiments, a plurality of tunable EM scattering elements 220 may be grouped together and associated with a single, variable, lumped impedance element. Conversely, a plurality of lumped impedance elements may be associated with a single sub-wavelength antenna element. In such an embodiment, the impedance of each of the plurality of lumped impedance elements may be controlled individually, or only some of them may be variable. In any of the above embodiments, X impedance control inputs may be varied to control the impedance of Y lumped impedance elements, where X and Y are integers that may or may not be equal.

As a specific example, 1,000 unique impedance control inputs may be provided for each of 1,000 unique lumped impedance elements. In such an embodiment, each of the impedance control inputs may be varied to control the impedance of each of the lumped impedance elements. As an alternative example, 1,000 unique lumped impedance elements may be controlled to be variably addressed by a binary control system with 10 inputs.

In some embodiments, one or more of the impedance control inputs may utilize the application of a direct current (DC) voltage to variably control the impedance of the lumped impedance element based on the magnitude of the applied DC voltage. In other embodiments, an impedance control input may utilize one or more of an electrical current input, a radiofrequency electromagnetic wave input, an optical radiation input, a thermal radiation input, a terahertz radiation input, an acoustic wave input, a phonon wave input, a mechanical pressure input, a mechanical contact input, a thermal conduction input, an electromagnetic input, an electrical impedance control input, and a mechanical switch input. In various embodiments, the lumped impedance elements may be modeled as two-port structures with an input and an output.

The lumped impedance elements may comprise one or more of a resistor, a capacitor, an inductor, a varactor, a diode, a MEMS capacitor, a BST capacitor, a tunable ferroelectric capacitor, a tunable MEMS inductor, a pin diode, an adjustable resistor, an HEMT transistor, and/or another type of transistor. Any of a wide variety of alternative circuit components (whether in discrete or integrated form) may be part of a lumped impedance element.

One or more hardware, software, and/or firmware solutions may be employed to perform operations for coding (e.g., linear coding) by controlling the impedance values of the lumped impedance elements via the one or more impedance control inputs. For instance, a computer-readable medium (e.g., a non-transitory computer-readable medium) may have instructions that are executable by a processor to form a specific coder (e.g., precoder, decoder). The executed operations or method steps may include determining a scattering matrix (S-matrix) of field amplitudes for each of a plurality of lumped ports, N.

The lumped ports, N, may include a plurality of internal lumped ports, $N_a$, with impedance values corresponding to the impedance values of the plurality of physical impedance elements (e.g., the tunable EM scattering elements 220). In at least some embodiments, the modeled lumped ports, N, include at least one external port, $N_e$, that is located physically external to the antenna system. In some embodiments, the lumped ports, N, also include a TL or other waveguide as another lumped port for the calculation of the S-matrix.

The S-matrix is expressible in terms of an impedance matrix, Z-matrix, with impedance values, $z_n$, of each of the plurality of lumped ports, N. Thus, by modifying one or more of the impedance values, $z_n$, associated with one or more of the plurality of lumped ports, N, a desired S-matrix of field amplitudes can be attained. The operations or method steps may include identifying a target coder (e.g., precoder, decoder, etc.) of the antenna system 100 defined in terms of target field amplitudes in the S-matrix for the at least one lumped external port, $N_e$.

An optimized port impedance vector $\{z_n\}$ of impedance values $z_n$ for each of the internal lumped ports, $N_a$, may be calculated that results in S-matrix elements for the one or more lumped external ports, $N_e$, that approximates the target coder for a given operating frequency. Once an optimized $\{z_n\}$ is identified that will result in the desired field amplitude values for the S-matrix elements of the one or more lumped external ports, $N_e$, the variable impedance control inputs may be adjusted as necessary to attain the optimized $\{z_n\}$.

As an example, a target coder may correspond to a diagonal portion of an S-matrix that relates electric fields at external lumped ports, $N_e$, corresponding to near-end EM radiating elements 102 to electric fields at external lumped ports, $N_e$, corresponding to far-end EM radiating elements 104. Any number of lumped external ports, $N_e$, may be used as part of the S-matrix calculation. Using a plurality of lumped external ports, $N_e$, may allow for the definition of a coder relating multiple near-end EM radiating elements 102 to multiple far-end EM radiating elements 104. Thus, the S-matrix may be calculated with a plurality of lumped external ports located external to the antenna device.

In various embodiments, at least one of the plurality of internal lumped ports, $N_a$, is strongly mutually coupled to at least one other internal lumped port, $N_a$. In some embodiments, at least one of the lumped external ports, $N_e$, is mutually coupled to one or more of the internal lumped ports, $N_a$. Strongly mutually coupled devices may be those in which an off-diagonal Z-matrix element, $Z_{ij}$, is greater in magnitude than one-tenth of the max ($|Z_{ii}|$, $|Z_{jj}|$).

Determining an optimized $\{z_n\}$ may include calculating an optimized Z-matrix using one or more of a variety of mathematical optimization techniques. For example, the optimized $\{z_n\}$ may be determined using a global optimization method involving a stochastic optimization method, a genetic optimization algorithm, a Monte-Carlo optimization method, a gradient-assisted optimization method, a simulated annealing optimization algorithm, a particle swarm optimization algorithm, a pattern search optimization method, a Multistart algorithm, and/or a global search optimization algorithm. Determining the optimized $\{z_n\}$ may be at least partially based on one or more initial guesses. Depending on the optimization algorithm used, the optimized values may be local optimizations based on initial guesses and may not in fact be true global optimizations. In other embodiments, sufficient optimization calculations are performed to ensure that a true globally optimized value is identified. In some embodiments, a returned optimization value or set of values may be associated with a confidence level or confidence value that the returned optimization value or set of values corresponds to global extrema as opposed to local extrema.

For gradient-assisted optimization, a gradient may be calculated analytically using an equation relating an S-parameter of the S-matrix to the Z-matrix and the optimized $\{z_n\}$. In some embodiments, a Hessian matrix calculation may be utilized that is calculated analytically using the equation relating the S-parameter to the Z-matrix and the optimized $\{z_n\}$. A quasi-Newton method may also be employed in some embodiments. In the context of optimization, the Hessian matrix may be considered a matrix of second derivatives of the scalar optimization goal function with respect to the optimization variable vector.

In some embodiments, the global optimization method may include exhaustively or almost exhaustively determining all local extrema by solving a multivariate polynomial equation and selecting a global extrema from the determined local extrema. Alternative gradient-based methods may be used, such as conjugate gradient (CG) methods and steepest descent methods, etc. In the context of optimization, a gradient may be a vector of derivatives of the scalar optimization goal function with respect to the vector of optimization variables.

Exhaustively determining all local extrema may be performed by splitting the domain based on expected roots and then splitting it into smaller domains to calculate a single root or splitting the domain until a domain with a single root is found. Determining the optimized $\{z_n\}$ may include solving the optimization problem in which a simple case may include a clumped function scalar function with one output and N inputs. The N inputs could be complex $z_n$ values and the optimized Z-matrix may be calculated based on an optimization of complex impedance values of the $z_n$ vectors.

The optimized $\{z_n\}$ may be calculated by finding an optimized Z-matrix based on an optimization of complex impedance values $z_n$. The optimized $\{z_n\}$ may be calculated by finding an optimized Z-matrix based on an optimization of roots of complex values of the impedance values $z_n$. The optimized $\{z_n\}$ may be calculated by finding an optimized Z-matrix based on an optimization of reactances associated with the impedance values of the impedance values $z_n$. The optimized $\{z_n\}$ may be calculated by finding an optimized Z-matrix based on an optimization of resistivities associated with the impedance values of the impedance values $z_n$. The optimization may be constrained to allow only positive or inductive values of reactances, or only negative or capacitive values of reactances. In other embodiments, the optimization of resistivities may be constrained to only allow for positive or passive values of resistivities.

The optimized $\{z_n\}$ may be calculated by finding an optimized Z-matrix based on an optimization of the impedance control inputs associated with the lumped impedance elements of each of the tunable EM scattering elements 220. The optimized $\{z_n\}$ may be calculated by optimizing a non-linear function. The non-linear function may relate impedance values for each of the internal lumped ports, $N_a$, as modeled in the S-matrix and the associated impedance control inputs. In some embodiments, the non-linear function may be fitted to a lower-order polynomial for optimization.

Mapping the Z-matrix values to the S-matrix values may include a non-linear mapping. In some instances, the mapping may be expressible as a single or multivariate polynomial. The polynomial may be of a relatively low order (e.g., 1-5). The S-matrix may comprise N values and the Z-matrix may comprise M values, where N and M are both integers and equal to one another, such that there is a 1:1 mapping of S-matrix values and Z-matrix values. Any of a wide variety of mappings are possible. For example, the S-matrix may comprise N values and the Z-matrix may comprise M values, where N squared is equal to M. Alternatively, there may be a 2:1 or 3:1 mapping or a 1:3 or 2:1 mapping.

The physical location of the at least one lumped external port, $N_e$, may be associated with a single-path or multipath propagation channel that is electromagnetically reflective and/or refractive. The multipath propagation channel may be in the near-field. In a radiative near-field, the multipath propagation pattern may be in the reactive near-field.

As previously described, the field amplitudes in the S-matrix may be used to define a target coder. In some embodiments, the target coder may be defined in terms of a target field amplitude for a single linear field polarization. The target radiation pattern may be defined in terms of a plurality of field amplitudes for a plurality of lumped external ports, $N_e$. The target radiation pattern may be defined in terms of a target field amplitude for at least two linear polarizations.

The target field amplitudes for one or more lumped external ports, $N_e$, may be selected to decrease far-field sidelobes of the antenna system 100, decrease a power level of one or more sidelobes of the antenna system 100, change a direction of a strongest sidelobe of the antenna system 100, increase a uniformity of a radiation profile in the near-field, and/or minimize a peak value of field amplitudes in the near-field. The system may utilize a minimax approximation algorithm to minimize a peak value of field amplitudes in the near-field.

Determining the optimized $\{z_n\}$ of impedance values for each of the internal lumped ports, $N_a$ (e.g., the tunable EM scattering elements 220), may include determining an optimized set of control values for the plurality of impedance control inputs that results in an field amplitude for the at least one lumped external port, $N_e$, in the S-matrix that approximates the target field amplitude for a given operating frequency or frequency range.

In conformity with the antenna systems and associated methods described above, a plurality of internal lumped ports, $N_a$, with impedance values corresponding to the impedance values of each of the plurality of lumped impedance elements may be considered jointly with one or more external ports, $N_e$, whose purpose is to account for the field intensity at a particular location exterior to the tunable medium 200. The external port, $N_e$, may represent an actual transmit or receive antenna (e.g., the far-end EM radiating elements 104 or the near-end EM radiating elements 102), in which case a known input impedance of that port may be assigned to the external port, $N_e$. In other embodiments, the one or more external ports, $N_e$, may be merely conceptual and used to quantify one or more field intensities at one or more locations. The external port, $N_e$, may be assumed infinitesimal in area and/or volume and located at a particular radius-vector $\vec{r}_0$.

Regardless of the number of external ports, $N_e$, the total number of ports, N, will correspond to the number of internal lumped ports, $N_a$, and the number of external ports, $N_e$. In some embodiments, a common port (e.g., a waveguide or TL) associated with the antenna system may also be considered. In any such embodiments, the total size of the system matrices will be generally of size N, which does not grow exponentially with the degrees of freedom or number of variable impedance elements.

The S-matrix element $S_{1N}$ represents the complex magnitude of field (e.g., electric field) at a particular location in space, given by the radius vector $\vec{r}_0$, normalized to the field magnitude at the input port. The absolute value $|S_{1N}|$, or the more algebraically convenient quantity $|S_{1N}|^2$ quantifies the quality of field concentration at that point. Maximizing this quantity (or minimizing in the case of forming nulls) represents a generalized beamforming algorithm.

In some embodiments, the location $\vec{r}_0$ is in the far-field of the rest of the system, and the algorithm yields directive beams in the far-field. In other embodiments, the point $\vec{r}_0$ is in the radiative near-field of the rest of the system, and the algorithm yields field focusing to that point. In still other embodiments, the point $\vec{r}_0$ is within the reactive near-field of at least one part of the rest of the system, and the algorithm maximizes electric field intensity and electric energy density at that point.

To find all local optima and the global optimum we can use the equation $q_n = \sqrt{z_n}$, which characterizes the individual port impedances $z_n$. The equation above, $S = U^\dagger (1 - \zeta Y_d \zeta)(1 + \zeta Y_d \zeta)^{-1} U$, is a rational (and meromorphic) analytical function of $\{q_n\}$.

To make this function bounded, and find its maxima that are attainable in a passive system, the function may be restricted to the multidimensional segment satisfying $\mathrm{Re}(z_n) \geq 0$, $n=1, \ldots, N$. Equivalently, this condition is $-\pi/2 \leq \arg z_n \leq \pi/2$, and consequently $-\pi/4 \leq \arg q_n \leq \pi/4$.

To reduce this problem to real values, each $q_n$ variable can be expressed through real variables, $q_n = \rho_n + i\Xi_n$. In this manner, the real valued function $|S_{1N}|^2$ is now a function of 2N real variables $\rho_n$, $\xi_n$, which is a rational function comprising a ratio of two 2N-variate polynomials.

In some embodiments, the resistance of each lumped element can be neglected by assuming $\mathrm{Re}(z_n)=0$, $z_n = i x_n$, with the real reactance values $x_n$. In such embodiments, the system as a whole is still assumed passive and lossy with the losses occurring on the paths between the ports and incorporated into the Z-matrix (or Y-matrix). This approximation satisfies the passivity constraints and also reduces the number of variables to N because $\sqrt{z}Y\sqrt{z} \rightarrow i\sqrt{x}Y\sqrt{x}$, and x is purely real.

The function $|S_{1N}|^2$ is necessarily bounded for a passive system, and therefore it has a finite global maximum as a function of real-valued variables $\rho_n$, $\xi_n$. Moreover, it has a finite number of local extrema. These extrema can be found by solving a set of 2N multivariate polynomial equations given by the standard zero gradient condition at the extremum:

$$\frac{\partial |S_{1N}|^2}{\partial \rho_n} = 0, \quad \frac{\partial |S_{1N}|^2}{\partial \xi_n} = 0,$$

$n=1, \ldots, N$.

In the simplified approach above, there are N unknowns $\chi_n = \sqrt{x_n}$ and N extremum conditions, $$\text{so} \frac{\partial |S_{1N}|^2}{\partial \chi_n} = 0,$$

$n=1, \ldots, N$.

Once these extrema are found, the extremal values of the function are evaluated numerically, and the global maximum is determined by choosing the largest local maximum. A similar approach can be performed to identify one or more minimums to attain a target radiation pattern with a null at one or more specific radius vectors $\vec{r}_0$.

Numerical and symbolic-manipulation algorithms exist that take advantage of the polynomial nature of the resulting equations. For example, Wolfram Mathematica™ function Maximize supports symbolic solving of the global optimization problem for multivariate polynomial equations, unconstrained or with multivariate polynomial constraints. This function is based on a Groebner-basis calculation algorithm, which reduces the multidimensional polynomial system to a triangular system, which is then reduced to a single scalar polynomial equation by back-substitution. Similar functionality exists in other software packages, including MATLAB™ with Symbolic Math Toolbox™, Maple™ and so on.

As previously discussed, once values are determined for each of the $z_n$ for the variable or tunable lumped impedance elements associated with the tunable EM scattering elements 220, each of the tunable EM scattering elements 220 can be tuned. In some embodiments, the tuning is static and the impedance values are set at the manufacturing stage. In other embodiments, a physical stimulus (e.g., mechanical, electric, electromagnetic, and/or a combination thereof) may be used to dynamically tune tunable EM scattering elements 220 to dynamically modify the radiation pattern of the antenna system 100 during operation.

Depending on the manufacturing techniques employed (e.g., 3D printing) the calculated values of optimum impedance values may translate trivially into the choices made for the selectable impedance elements. In contrast, for the dynamically adjustable, variable, or tunable impedance elements, there is generally a non-trivial relationship between the complex impedance of the elements and the stimuli that control them. In some embodiments, the relationship between the complex impedance of the impedance elements and the control inputs may be based on a magnitude of an applied signal. Appreciating that the magnitude of the stimulus may be binary in some embodiments (i.e., on or off), the relationship may be modeled as $z_n = f_n(s_n)$, where $s_n$ is the real-valued magnitude of the stimulus. The function $f_n(s_n)$ can be fitted with a polynomial order S, and substituted into $|S_{1N}|^2$. The functions $f_n$ can be all the same when identical dynamically tunable elements are used, in which case there will be N extremum conditions for N real variables $s_n$ each of which is still a rational function.

In the lowest-order approximation, the fitting polynomial can be linear (S=1), in which case the complexity of the extremum problem is still $$\frac{\partial |S_{1N}|^2}{\partial \chi_n} = 0,$$

$n=1, \ldots, N$. The quality of a polynomial approximation depends greatly on the practically available range of the stimulus, or the range chosen for other practical considerations. Because the $s_n$ variables are restricted to a finite interval, the optimization problem can be solved with the corresponding constraints. When the optimization problem is solved by exhaustive enumeration of the extrema, these constrains are applied trivially and the local extrema not satisfying the constraints are excluded from the enumeration.

A wide range of coding applications are contemplated and made possible using the systems and methods described herein. For example, the lumped impedance element approach may be used to implement the antenna systems 100, 400, 500, 600, and other antenna systems discussed above, and the method 700 discussed above. in some embodiments, beamforming may include a multipath propagation channel involving one or more reflective, refractive, or generally scattering object. In many embodiments, the relevant properties of the multipath propagation channel are incorporated into the Z-matrix. Numerical simulations that lead to a calculation of the Z-matrix may include a model of such a channel. A model of the multipath propagation channel can be simulated using any of a wide variety of simulation software packages, including, for example, ANSYS HFSS, COMSOL RF, CST MWS, etc.

In some embodiments, a particular linear field polarization can be achieved by considering the output port to be a port susceptible to only one linear polarization. For instance, a lumped (electrically small, single-mode) port is susceptible to a linear polarization with the electric field directed across the gap of the port.

In some embodiments, a target radiation pattern may be identified that includes a combination of two linear polarizations, including without limitation a circular polarization, that can be achieved by considering two co-located output ports, each of which is susceptible to only one linear polarization. In such an embodiment, the system matrices may be slightly increased by the addition of more external ports, $N_e$, but the addition of a few external ports increases the complexity by a relatively small constant value and will not change the general course of the algorithms and methods described herein.

In some embodiments, multiple beams can be formed simultaneously (the process known as multi-beam forming) by considering M output ports located in different directions with respect to the rest of the system. The size of the system matrices may then correspond to $N=N_a+M+1$, which does not change the general course of the algorithm and does not exponentially increase the complexity.

As previously discussed, approximate nulls of the field can be formed, either in the far-field or near-field, by considering a minimization problem for the rational function of the equations above. Similarly, a required level of sidelobe suppression for a target radiation pattern can be attained by maximizing the function $F=|S_{1,N}|^2-\alpha|S_{1,N+1}|^2$, where the $N^{th}$ port measures the field intensity in one direction, the $(N+1)^{th}$ port measures field intensity in a specified sidelobe direction, and $\alpha$ is a selectable weight coefficient reflecting the degree to which sidelobe suppression should be achieved. It is appreciated that the equation above can be readily generalized to include any number of sidelobes in any number of directions. Thus, it is appreciated that instead of optimizing the impedance values themselves, a function relating the impedance control inputs to the impedance values of the variable (i.e., tunable) impedance elements may be substituted into the equations to allow for the direct optimization of the impedance control inputs.

A list of example embodiments disclosed herein follows. In the interest of space and complexity of the disclosure, not each of these example embodiments and other embodiments and examples disclosed herein are explicitly indicated as combinable. Each of these example embodiments and the other embodiments and examples disclosed herein are, however, intended to be combinable, except where a person of ordinary skill in the art would understand that they are not combinable.

In some embodiments, an antenna system includes a plurality of near-end electromagnetic (EM) radiating elements, and a tunable medium positioned relative to the plurality of near-end EM radiating elements and a plurality of far-end EM radiating elements to scatter EM radiation transmitted between the plurality of near-end EM radiating elements and the plurality of far-end EM radiating elements. The tunable medium includes subwavelength EM scattering elements corresponding to lumped impedance elements, and variable impedance control inputs configured to enable selection of an impedance value for each of the lumped impedance elements. The antenna system also includes control circuitry including a controller operably coupled to the variable impedance control inputs of the tunable medium. The control circuitry is programmed to determine a scattering matrix (S-matrix) relating field amplitudes at lumped ports. The lumped ports include internal lumped ports located internally to the tunable medium, each of the internal lumped ports corresponding to a different one of the lumped impedance elements of the tunable medium. The lumped ports also include external lumped ports located externally to the tunable medium, each of at least a portion of the external lumped ports corresponding to a different one of the plurality of near-end EM radiating elements and the plurality of far-end EM radiating elements. The control circuitry is also programmed to determine at least a portion of component values of a desired S-matrix relating the field amplitudes at the lumped ports, and adjust at least one of the variable impedance control inputs to modify the impedance value of at least one of the lumped impedance elements to cause the S-matrix to modify to at least approximate at least a portion of the desired S-matrix.

In some embodiments, an antenna system includes a controller configured to dynamically adjust at least one of variable impedance control inputs during operation of the antenna system.

In some embodiments, an antenna system includes a controller configured to pre-select a state of lumped impedance elements and hold the lumped impedance elements in the selected state during operation of the antenna system.

In some embodiments, an antenna system includes control circuitry including signal generation circuitry operably coupled to a plurality of near-end EM radiating elements and configured to deliver EM signals including a plurality of different data streams to a plurality of near-end EM radiating elements for transmission to a plurality of far-end EM radiating elements.

In some embodiments, an antenna system includes a plurality of far-end EM radiating elements distributed between at least two physically separate devices.

In some embodiments, an antenna system includes a number of a plurality of data streams equal to a number of a plurality of far-end EM radiating elements, and each of a plurality of far-end EM radiating elements receives only one of the plurality of data streams.

In some embodiments, an antenna system includes a number of a plurality of data streams less than a number of a plurality of far-end EM radiating elements.

In some embodiments, an antenna system includes a number of a plurality of near-end EM radiating elements equal to a number of a plurality of data streams.

In some embodiments, an antenna system includes a number of the plurality of near-end EM radiating elements greater than a number of a plurality of data streams.

In some embodiments, an antenna system includes at least one of a plurality of near-end EM radiating elements including a dipole antenna.

In some embodiments, an antenna system includes at least one of a plurality of near-end EM radiating elements including an at least substantially omnidirectional antenna.

In some embodiments, an antenna system includes an at least substantially omnidirectional antenna including a dipole antenna that is at least substantially omnidirectional in a plane perpendicular to the dipole antenna.

In some embodiments, an antenna system includes at least one of a plurality of near-end EM radiating elements including a patch antenna.

In some embodiments, an antenna system includes at least one of a plurality of near-end EM radiating elements including an aperture antenna.

In some embodiments, an antenna system includes at least one of a plurality of near-end EM radiating elements including an antenna array.

In some embodiments, an antenna system includes lumped impedance elements including tunable capacitive elements.

In some embodiments, an antenna system includes capacitive elements including at least one of diodes and transistors.

In some embodiments, an antenna system includes tunable capacitive elements including at least one variable dielectric constant material.

In some embodiments, an antenna system includes tunable capacitive elements including at least one liquid crystal element.

In some embodiments, an antenna system includes lumped impedance elements including variable resistive elements.

In some embodiments, an antenna system includes variable resistive elements including at least one of diodes and transistors.

In some embodiments, an antenna system includes lumped impedance elements including variable inductance elements.

In some embodiments, an antenna system includes a tunable medium that is tunable with a number of degrees of freedom that is greater than or equal to a number of independent elements of a channel matrix of channels between a plurality of near-end EM radiating elements and a plurality of far-end EM radiating elements.

In some embodiments, an antenna system includes a tunable medium that is located in front of a plurality of near-end EM radiating elements with a front side of the plurality of near-end EM radiating elements facing generally towards a plurality of far-end EM radiating elements.

In some embodiments, an antenna system includes a controller programmed to control a tunable medium to scatter EM radiation at least substantially in a forward direction relative to a plurality of near-end EM radiating elements.

In some embodiments, an antenna system includes a controller programmed to control a tunable medium to scatter EM radiation at least substantially in a backward direction relative to a plurality of near-end EM radiating elements.

In some embodiments, an antenna system includes a controller programmed to control a tunable medium to scatter EM radiation at least substantially in a direction of a specular reflection relative to a surface of a body carrying a plurality of near-end EM radiating elements.

In some embodiments, an antenna system includes a controller programmed to control a tunable medium to scatter EM radiation at least substantially in a direction towards a plurality of far-end EM radiating elements.

In some embodiments, an antenna system includes a tunable medium at least partially surrounding at least a portion of a plurality of near-end EM radiating elements.

In some embodiments, an antenna system includes a tunable medium including a tunable radome.

In some embodiments, an antenna system includes a controller programmed to determine a desired S-matrix implementing a linear beamforming precoder.

In some embodiments, an antenna system includes a controller programmed to determine a desired S-matrix implementing a linear spatial-diversity precoder.

In some embodiments, an antenna system includes a controller programmed to determine a desired S-matrix implementing a linear spatial multiplexing precoder.

In some embodiments, an antenna system includes a controller programmed to determine values of control parameters to be input to variable impedance control inputs of a tunable medium.

In some embodiments, an antenna system includes a controller programmed to determine values of control parameters to be input to variable impedance control inputs of a tunable medium by solving an inverse scattering problem, wherein the inverse scattering problem is postulated as an equality between an S-matrix and a desired S-matrix.

In some embodiments, an antenna system includes a controller programmed to determine values of the control parameters to be input to variable impedance control inputs of a tunable medium by determining a minimization of a matrix norm of a difference between an S-matrix and a desired S-matrix.

In some embodiments, an antenna system includes a controller programmed to determine values of control parameters to be input to variable impedance control inputs of a tunable medium by determining a minimization of a sum of squared differences between at least a portion of component values from an S-matrix and corresponding component values of a desired S-matrix.

In some embodiments, an antenna system includes a controller programmed to determine at least a portion of component values from an S-matrix that relate field amplitudes at a plurality of near-end EM radiating elements to field amplitudes at a plurality of far-end EM radiating elements.

In some embodiments, an antenna system includes a controller programmed to determine values of control parameters to be input to variable impedance control inputs of a tunable medium by determining a minimization of a sum of squared differences between at least a portion of component values from an S-matrix and corresponding component values of a desired S-matrix, plus a weighted sum of frequency dispersion magnitudes of the portion of component values.

In some embodiments, an antenna system includes a controller programmed to determine a subset of an S-matrix including a submatrix including component values that relate field amplitudes at a plurality of near-end EM radiating elements to field amplitudes at a plurality of far-end EM radiating elements.

In some embodiments, an antenna system includes a controller programmed to determine a desired S-matrix to include a desired submatrix corresponding to a submatrix, the desired submatrix at least approximately equal to a diagonal matrix.

In some embodiments, an antenna system includes a controller programmed to determine a desired S-matrix to include a desired submatrix corresponding to a submatrix, the desired submatrix including off-diagonal elements, wherein a magnitude of each of the off-diagonal elements is less than or equal to a predetermined threshold value.

In some embodiments, an antenna system includes lumped ports including far-end internal lumped ports, wherein the far-end internal lumped ports correspond to lumped impedance elements of a far-end tunable medium.

In some embodiments, an antenna system includes a controller programmed to determine an S-matrix as a function of an impedance matrix (Z-matrix) and an admittance vector (y-vector), wherein the Z-matrix includes impedance values relating voltage potentials at each of lumped ports to currents at each of the lumped ports with all others of the lumped ports open at an operational frequency of the antenna system, and the y-vector is a diagonal matrix including admittance values of the lumped ports.

In some embodiments, an antenna system includes a controller programmed to determine an S-matrix as a function of an admittance matrix (Y-matrix) and an impedance vector (z-vector), wherein the Y-matrix includes admittance values relating voltage potentials at each of lumped ports to currents at each of the lumped ports with all others of the lumped ports open at an operational frequency of the antenna system and the z-vector is a diagonal matrix including impedance values of the lumped ports.

In some embodiments, an antenna system includes control circuitry including signal processing circuitry operably coupled to a plurality of near-end EM radiating elements and configured to receive EM signals including a plurality of different data streams from a plurality of far-end EM radiating elements through the plurality of near-end EM radiating elements.

In some embodiments, an antenna system includes a plurality of far-end EM radiating elements that is distributed between at least two physically separate devices.

In some embodiments, an antenna system includes a number of a plurality of data streams that is equal to a number of a plurality of far-end EM radiating elements, and each of the plurality of far-end EM radiating elements transmits only one of the plurality of data streams.

In some embodiments, an antenna system includes a number of a plurality of data streams that is less than a number of a plurality of far-end EM radiating elements.

In some embodiments, an antenna system includes a number of a plurality of near-end EM radiating elements that is equal to a number of a plurality of data streams.

In some embodiments, an antenna system includes a number of a plurality of near-end EM radiating elements that is greater than a number of a plurality of data streams.

In some embodiments, an antenna system includes at least one of a plurality of near-end EM radiating elements including a dipole antenna.

In some embodiments, an antenna system includes at least one of a plurality of near-end EM radiating elements including an at least substantially omnidirectional antenna.

In some embodiments, an antenna system includes an at least substantially omnidirectional antenna including a dipole antenna that is at least substantially omnidirectional in a plane perpendicular to the dipole antenna.

In some embodiments, an antenna system includes at least one of a plurality of near-end EM radiating elements including a patch antenna.

In some embodiments, an antenna system includes at least one of a plurality of near-end EM radiating elements including an aperture antenna.

In some embodiments, an antenna system includes at least one of a plurality of near-end EM radiating elements including an antenna array.

In some embodiments, an antenna system includes lumped impedance elements including tunable capacitive elements.

In some embodiments, an antenna system includes capacitive elements including at least one of diodes and transistors.

In some embodiments, an antenna system includes tunable capacitive elements including at least one variable dielectric constant material.

In some embodiments, an antenna system includes tunable capacitive elements including at least one liquid crystal element.

In some embodiments, an antenna system includes lumped impedance elements including variable resistive elements.

In some embodiments, an antenna system includes variable resistive elements including at least one of diodes and transistors.

In some embodiments, an antenna system includes lumped impedance elements including variable inductance elements.

In some embodiments, an antenna system includes a tunable medium that is tunable with a number of degrees of freedom that is greater than or equal to a number of independent elements of a channel matrix of channels between a plurality of near-end EM radiating elements and a plurality of far-end EM radiating elements.

In some embodiments, an antenna system includes a tunable medium that is located in front of a plurality of near-end EM radiating elements with a front side of the plurality of near-end EM radiating elements facing generally towards a plurality of far-end EM radiating elements.

In some embodiments, an antenna system includes a tunable medium that at least partially surrounds at least a portion of a plurality of near-end EM radiating elements.

In some embodiments, an antenna system includes a tunable medium including a tunable radome.

In some embodiments, an antenna system includes a controller programmed to determine a desired S-matrix implementing a linear beamforming decoder.

In some embodiments, an antenna system includes a controller programmed to determine a desired S-matrix implementing a linear spatial-diversity decoder.

In some embodiments, an antenna system includes a controller programmed to determine a desired S-matrix implementing a linear spatial multiplexing decoder.

In some embodiments, an antenna system includes a controller programmed to determine values of control parameters to be input to the variable impedance control inputs of the tunable medium.

In some embodiments, an antenna system includes a controller programmed to determine values of control parameters to be input to variable impedance control inputs of a tunable medium by solving an inverse scattering problem, wherein the inverse scattering problem is postulated as an equality between an S-matrix and a desired S-matrix.

In some embodiments, an antenna system includes a controller programmed to determine values of control parameters to be input to variable impedance control inputs of a tunable medium by determining a minimization of a matrix norm of a difference between an S-matrix and a desired S-matrix.

In some embodiments, an antenna system includes a controller programmed to determine values of control parameters to be input to variable impedance control inputs of a tunable medium by determining a minimization of a sum of squared differences between at least a portion of component values from an S-matrix and corresponding component values of a desired S-matrix.

In some embodiments, an antenna system includes a controller programmed to determine at least a portion of component values from an S-matrix relating field amplitudes at a plurality of near-end EM radiating elements to field amplitudes at a plurality of far-end EM radiating elements.

In some embodiments, an antenna system includes a controller programmed to determine values of control parameters to be input to variable impedance control inputs of a tunable medium by determining a minimization of a sum of squared differences between at least a portion of component values from an S-matrix and corresponding component values of a desired S-matrix, plus a weighted sum of frequency dispersion magnitudes of the portion of component values.

In some embodiments, an antenna system includes a controller programmed to determine a subset of an S-matrix including a submatrix including component values that relate field amplitudes at a plurality of far-end EM radiating elements to field amplitudes at a plurality of near-end EM radiating elements.

In some embodiments, an antenna system includes a controller programmed to determine a desired S-matrix to include a desired submatrix corresponding to a submatrix, the desired submatrix at least approximately equal to a diagonal matrix.

In some embodiments, an antenna system includes a controller programmed to determine a desired S-matrix to include a desired submatrix corresponding to a submatrix, the desired submatrix including off-diagonal elements, wherein a magnitude of each of the off-diagonal elements is less than or equal to a predetermined threshold value.

In some embodiments, an antenna system includes lumped ports including far-end internal lumped ports, wherein the far-end internal lumped ports correspond to lumped impedance elements of a far-end tunable medium.

In some embodiments, an antenna system includes a controller programmed to determine an S-matrix as a function of an impedance matrix (Z-matrix) and an admittance vector (y-vector), wherein the Z-matrix includes impedance values relating voltage potentials at each of lumped ports to currents at each of the lumped ports with all others of the lumped ports open at an operational frequency of the antenna system, and the y-vector is a diagonal matrix including admittance values of the lumped ports.

In some embodiments, an antenna system includes a controller programmed to determine an S-matrix as a function of an admittance matrix (Y-matrix) and an impedance vector (z-vector), wherein the Y-matrix includes admittance values relating voltage potentials at each of lumped ports to currents at each of the lumped ports with all others of the lumped ports open at an operational frequency of the antenna system, and the z-vector is a diagonal matrix including impedance values of the lumped ports.

In some embodiments, a method of operating an antenna system includes operating a plurality of near-end electromagnetic (EM) radiating elements, and determining a scattering matrix (S-matrix) relating field amplitudes at lumped ports. The lumped ports include internal lumped ports located internally to the tunable medium. Each of the internal lumped ports corresponds to a different one of lumped impedance elements associated with subwavelength EM scattering elements of a tunable medium positioned relative to the plurality of near-end EM radiating elements and a plurality of far-end EM radiating elements to scatter EM radiation transmitted between the plurality of near-end EM radiating elements and the plurality of far-end EM radiating elements. The lumped ports also include external lumped ports located externally to the tunable medium. Each of at least a portion of the external lumped ports corresponds to a different one of the plurality of near-end EM radiating elements and the plurality of far-end EM radiating elements. The method also includes determining at least a portion of component values of a desired S-matrix relating the field amplitudes at the lumped ports. The method further includes adjusting at least one variable impedance control input configured to enable selection of an impedance value for each of the lumped impedance elements. Adjusting includes modifying the impedance value of at least one of the lumped impedance elements to cause the S-matrix to modify to at least approximate at least a portion of the desired S-matrix. The method also includes scattering the EM radiation transmitted between the plurality of near-end EM radiating elements and the plurality of far-end EM radiating elements with the tunable medium.

In some embodiments, a method includes adjusting at least one variable impedance control input, which includes dynamically adjusting the at least one variable impedance control input during operation of an antenna system.

In some embodiments, a method includes adjusting at least one variable impedance control input, which includes pre-selecting a state of lumped impedance elements and holding the lumped impedance elements in the selected state during operation of the antenna system.

In some embodiments, a method includes delivering EM signals including a plurality of different data streams to a plurality of near-end EM radiating elements for transmission to a plurality of far-end EM radiating elements.

In some embodiments, a method includes delivering EM signals, which includes delivering the EM signals to a plurality of near-end EM radiating elements for transmission to a plurality of far-end EM radiating elements distributed between at least two physically separate devices.

In some embodiments, a method includes delivering EM signals, which includes delivering EM signals including a number of different data streams that is equal to a number of a plurality of far-end EM radiating elements, each of the plurality of far-end EM radiating elements receiving only one of the plurality of data streams.

In some embodiments, a method includes delivering EM signals, which includes delivering EM signals including a number of different data streams that is less than a number of a plurality of far-end EM radiating elements.

In some embodiments, a method includes delivering EM signals, which includes delivering EM signals including a number of different data streams that is equal to a number of the plurality of near-end EM radiating elements.

In some embodiments, a method includes delivering EM signals, which includes delivering EM signals including a number of different data streams that is less than a number of a plurality of near-end EM radiating elements.

In some embodiments, a method includes operating a plurality of near-end EM radiating elements, which includes operating at least one dipole antenna.

In some embodiments, a method includes operating a plurality of near-end EM radiating elements, which includes operating an at least substantially omnidirectional antenna.

In some embodiments, a method includes operating an at least substantially omnidirectional antenna, which includes operating a dipole antenna that is at least substantially omnidirectional in a plane perpendicular to the dipole antenna.

In some embodiments, a method includes operating a plurality of near-end EM radiating elements, which includes operating at least one patch antenna.

In some embodiments, a method includes operating a plurality of near-end EM radiating elements, which includes operating at least one aperture antenna.

In some embodiments, a method includes operating a plurality of near-end EM radiating elements, which includes operating a plurality of antenna arrays.

In some embodiments, a method includes scattering EM radiation with a tunable medium, which includes scattering the EM radiation with lumped impedance elements including tunable capacitive elements.

In some embodiments, a method includes scattering EM radiation with tunable capacitive elements, which includes scattering the EM radiation with at least one of diodes and transistors.

In some embodiments, a method includes scattering EM radiation with tunable capacitive elements, which includes scattering the EM radiation with at least one variable dielectric constant material.

In some embodiments, a method includes scattering EM radiation with tunable capacitive elements, which includes scattering the EM radiation with at least one liquid crystal element.

In some embodiments, a method includes scattering EM radiation with a tunable medium, which includes scattering the EM radiation with lumped impedance elements including variable resistive elements.

In some embodiments, a method includes scattering EM radiation with variable resistive elements, which includes scattering the EM radiation with at least one of diodes and transistors.

In some embodiments, a method includes scattering EM radiation with a tunable medium, which includes scattering the EM radiation with lumped impedance elements including variable inductance elements.

In some embodiments, a method includes scattering EM radiation with a tunable medium, which includes scattering the EM radiation with a tunable medium that is tunable with a number of degrees of freedom that is greater than or equal to a number of independent elements of a channel matrix of channels between a plurality of near-end EM radiating elements and a plurality of far-end EM radiating elements.

In some embodiments, a method includes operating a plurality of near-end EM radiating elements, which includes operating the plurality of near-end EM radiating elements with a tunable medium located in front of the plurality of near-end EM radiating elements with a front side of the plurality of near-end EM radiating elements facing generally towards a plurality of far-end EM radiating elements.

In some embodiments, a method includes scattering EM radiation transmitted between a plurality of near-end EM radiating elements and a plurality of far-end EM radiating elements, which includes scattering the EM radiation at least substantially in a forward direction relative to the plurality of near-end EM radiating elements.

In some embodiments, a method includes scattering EM radiation transmitted between a plurality of near-end EM radiating elements and a plurality of far-end EM radiating elements, which includes scattering the EM radiation at least substantially in a backward direction relative to the plurality of near-end EM radiating elements.

In some embodiments, a method includes scattering EM radiation transmitted between a plurality of near-end EM radiating elements and a plurality of far-end EM radiating elements, which includes scattering the EM radiation at least substantially in a direction of a specular reflection relative to a surface of a body carrying the plurality of near-end EM radiating elements.

In some embodiments, a method includes scattering EM radiation transmitted between a plurality of near-end EM radiating elements and a plurality of far-end EM radiating elements, which includes scattering the EM radiation at least substantially in a direction towards a plurality of far-end EM radiating elements.

In some embodiments, a method includes operating a plurality of near-end EM radiating elements, which includes operating the plurality of near-end EM radiating elements with a tunable medium at least partially surrounding at least a portion of the plurality of near-end EM radiating elements.

In some embodiments, a method includes operating a plurality of near-end EM radiating elements with a tunable medium at least partially surrounding at least a portion of the plurality of near-end EM radiating elements, which includes operating the plurality of near-end EM radiating elements inside of a tunable radome including the tunable medium.

In some embodiments, a method includes determining at least a portion of component values of a desired S-matrix, which includes determining the at least a portion of component values of the desired S-matrix to implement a linear beamforming precoder.

In some embodiments, a method includes determining at least a portion of component values of a desired S-matrix, which includes determining the at least a portion of component values of the desired S-matrix to implement a linear spatial-diversity precoder.

In some embodiments, a method includes determining at least a portion of component values of a desired S-matrix, which includes determining the at least a portion of component values of the desired S-matrix to implement a linear spatial multiplexing precoder.

In some embodiments, a method includes determining values of control parameters to be input to variable impedance control inputs of a tunable medium.

In some embodiments, a method includes determining values of control parameters, which includes solving an inverse scattering problem, wherein the inverse scattering problem is postulated as an equality between an S-matrix and a desired S-matrix.

In some embodiments, a method includes determining values of control parameters, which includes determining a minimization of a matrix norm of a difference between an S-matrix and a desired S-matrix.

In some embodiments, a method includes determining values of control parameters, which includes determining a minimization of a sum of squared differences between at least a portion of component values from an S-matrix and corresponding component values of a desired S-matrix.

In some embodiments, a method includes determining a minimization of a sum of squared differences between at least a portion of component values from an S-matrix and corresponding component values of a desired matrix, wherein the at least a portion of component values from the S-matrix comprises component values of the S-matrix that relate field amplitudes at the plurality of near-end EM radiating elements to field amplitudes at the plurality of far-end EM radiating elements.

In some embodiments, a method includes determining values of control parameters, which includes determining a minimization of a sum of squared differences between at least a portion of component values from an S-matrix and corresponding component values of a desired S-matrix, plus a weighted sum of frequency dispersion magnitudes of the portion of component values.

In some embodiments, a method includes determining an S-matrix relating field amplitudes at lumped ports, which includes determining the S-matrix to include a submatrix comprising component values that relate field amplitudes at the plurality of near-end EM radiating elements to field amplitudes at the plurality of far-end EM radiating elements.

In some embodiments, a method includes determining at least a portion of component values of a desired S-matrix, which includes determining the desired S-matrix to include a desired submatrix corresponding to a submatrix, the desired submatrix at least approximately equal to a diagonal matrix.

In some embodiments, a method includes determining at least a portion of component values of a desired S-matrix, which includes determining the desired S-matrix to include off-diagonal elements, wherein a magnitude of each of the off-diagonal elements is less than or equal to a predetermined threshold value.

In some embodiments, a method includes determining an S-matrix relating field amplitudes at lumped ports, which includes determining the S-matrix considering far-end internal lumped ports, wherein the far-end internal lumped ports correspond to lumped impedance elements of a far-end tunable medium.

In some embodiments, a method includes determining at least a portion of component values of a desired S-matrix, which includes determining the S-matrix as a function of an impedance matrix (Z-matrix) and an admittance vector (y-vector), wherein the Z-matrix includes impedance values relating voltage potentials at each of lumped ports to currents at each of the lumped ports with all others of the lumped ports open at an operational frequency of the antenna system, and the y-vector is a diagonal matrix including admittance values of the lumped ports.

In some embodiments, a method includes determining at least a portion of component values of a desired S-matrix, which includes determining the S-matrix as a function of an admittance matrix (Y-matrix) and an impedance vector (z-vector), wherein the Y-matrix includes impedance values relating voltage potentials at each of lumped ports to currents at each of the lumped ports with all others of the lumped ports open at an operational frequency of the antenna system, and the z-vector is a diagonal matrix including impedance values of the lumped ports.

In some embodiments, a method includes receiving EM signals including a plurality of different data streams from a plurality of far-end EM radiating elements through a plurality of near-end EM radiating elements.

In some embodiments, a method includes receiving EM signals, which includes receiving EM signals from a plurality of far-end EM radiating elements distributed between at least two physically separate devices.

In some embodiments, a method includes receiving EM signals, which includes receiving EM signals including a number of different data streams that is equal to a number of a plurality of far-end EM radiating elements, and each of the plurality of far-end EM radiating elements transmits only one of the plurality of data streams.

In some embodiments, a method includes receiving EM signals, which includes receiving EM signals including a number of different data streams that is less than a number of a plurality of far-end EM radiating elements.

In some embodiments, a method includes receiving EM signals, which includes receiving EM signals including a number of different data streams that is equal to a number of a plurality of near-end EM radiating elements.

In some embodiments, a method includes receiving EM signals, which includes receiving EM signals including a number of different data streams that is less than a number of a plurality of near-end EM radiating elements.

In some embodiments, a method includes operating a plurality of near-end EM radiating elements, which includes operating at least one dipole antenna.

In some embodiments, a method includes operating a plurality of near-end EM radiating elements, which includes operating an at least substantially omnidirectional antenna.

In some embodiments, a method includes operating an at least substantially omnidirectional antenna, which includes operating a dipole antenna that is at least substantially omnidirectional in a plane perpendicular to the dipole antenna.

In some embodiments, a method includes operating a plurality of near-end EM radiating elements, which includes operating at least one patch antenna.

In some embodiments, a method includes operating a plurality of near-end EM radiating elements, which includes operating at least one aperture antenna.

In some embodiments, a method includes operating a plurality of near-end EM radiating elements, which includes operating a plurality of antenna arrays.

In some embodiments, a method includes scattering EM radiation with a tunable medium, which includes scattering the EM radiation with lumped impedance elements including tunable capacitive elements.

In some embodiments, a method includes scattering EM radiation with tunable capacitive elements, which includes scattering the EM radiation with at least one of diodes and transistors.

In some embodiments, a method includes scattering EM radiation with tunable capacitive elements, which includes scattering the EM radiation with at least one variable dielectric constant material.

In some embodiments, a method includes scattering EM radiation with tunable capacitive elements, which includes scattering the EM radiation with at least one liquid crystal element.

In some embodiments, a method includes scattering EM radiation with a tunable medium, which includes scattering the EM radiation with lumped impedance elements including variable resistive elements.

In some embodiments, a method includes scattering EM radiation with variable resistive elements, which includes scattering the EM radiation with at least one of diodes and transistors.

In some embodiments, a method includes scattering EM radiation with a tunable medium, which includes scattering the EM radiation with lumped impedance elements including variable inductance elements.

In some embodiments, a method includes scattering EM radiation with a tunable medium, which includes scattering the EM radiation with a tunable medium that is tunable with a number of degrees of freedom that is greater than or equal to a number of independent elements of a channel matrix of channels between a plurality of near-end EM radiating elements and a plurality of far-end EM radiating elements.

In some embodiments, a method includes operating a plurality of near-end EM radiating elements, which includes operating the plurality of near-end EM radiating elements with a tunable medium located in front of the plurality of near-end EM radiating elements with a front side of the plurality of near-end EM radiating elements facing generally towards a plurality of far-end EM radiating elements.

In some embodiments, a method includes operating a plurality of near-end EM radiating elements, which includes operating the plurality of near-end EM radiating elements with a tunable medium at least partially surrounding at least a portion of the plurality of near-end EM radiating elements.

In some embodiments, a method includes operating a plurality of near-end EM radiating elements with a tunable medium at least partially surrounding at least a portion of the plurality of near-end EM radiating elements, which includes operating the plurality of near-end EM radiating elements inside of a tunable radome comprising the tunable medium.

In some embodiments, a method includes determining at least a portion of component values of a desired S-matrix, which includes determining the at least a portion of component values of the desired S-matrix to implement a linear beamforming decoder.

In some embodiments, a method includes determining at least a portion of component values of a desired S-matrix, which includes determining the at least a portion of component values of the desired S-matrix to implement a linear spatial-diversity decoder.

In some embodiments, a method includes determining at least a portion of component values of a desired S-matrix, which includes determining the at least a portion of component values of the desired S-matrix to implement a linear spatial multiplexing decoder.

In some embodiments, a method includes determining values of control parameters to be input to variable impedance control inputs of a tunable medium.

In some embodiments, a method includes determining values of control parameters, which includes solving an inverse scattering problem, wherein the inverse scattering problem is postulated as an equality between an S-matrix and a desired S-matrix.

In some embodiments, a method includes determining values of control parameters, which includes determining a minimization of a matrix norm of a difference between an S-matrix and a desired S-matrix.

In some embodiments, a method includes determining values of control parameters, which includes determining a minimization of a sum of squared differences between at least a portion of component values from an S-matrix and corresponding component values of a desired S-matrix.

In some embodiments, a method includes determining a minimization of a sum of squared differences between at least a portion of component values from an S-matrix and corresponding component values of a desired S-matrix, wherein the at least a portion of component values from the S-matrix comprises component values of the S-matrix that relate field amplitudes at a plurality of far-end EM radiating elements to field amplitudes at a plurality of near-end EM radiating elements.

In some embodiments, a method includes determining values of control parameters, which includes determining a minimization of a sum of squared differences between at least a portion of component values from an S-matrix and corresponding component values of a desired S-matrix, plus a weighted sum of frequency dispersion magnitudes of the portion of component values.

In some embodiments, a method includes determining an S-matrix relating field amplitudes at lumped ports, which includes determining the S-matrix to include a submatrix comprising component values that relate field amplitudes at a plurality of far-end EM radiating elements to field amplitudes at a plurality of near-end EM radiating elements.

In some embodiments, a method includes determining at least a portion of component values of a desired S-matrix, which includes determining the desired S-matrix to include a desired submatrix corresponding to a submatrix, the desired submatrix at least approximately equal to a diagonal matrix.

In some embodiments, a method includes determining at least a portion of component values of a desired S-matrix, which includes determining the desired S-matrix to include off-diagonal elements, wherein a magnitude of each of the off-diagonal elements is less than or equal to a predetermined threshold value.

In some embodiments, a method includes determining an S-matrix relating field amplitudes at lumped ports, which includes determining the S-matrix considering far-end internal lumped ports, wherein the far-end internal lumped ports correspond to lumped impedance elements of a far-end tunable medium.

In some embodiments, a method includes determining at least a portion of component values of a desired S-matrix, which includes determining an S-matrix as a function of an impedance matrix (Z-matrix) and an admittance vector (y-vector), wherein the Z-matrix includes impedance values relating voltage potentials at each of lumped ports to currents at each of the lumped ports with all others of the lumped ports open at an operational frequency of the antenna system, and the y-vector is a diagonal matrix including admittance values of the lumped ports.

In some embodiments, a method includes determining at least a portion of component values of a desired S-matrix, which includes determining an S-matrix as a function of an admittance matrix (Y-matrix) and an impedance vector (z-vector), wherein the Y-matrix includes impedance values relating voltage potentials at each of lumped ports to currents at each of the lumped ports with all others of the lumped ports open at an operational frequency of the antenna system, and the z-vector is a diagonal matrix including impedance values of the lumped ports.

Figure 9:
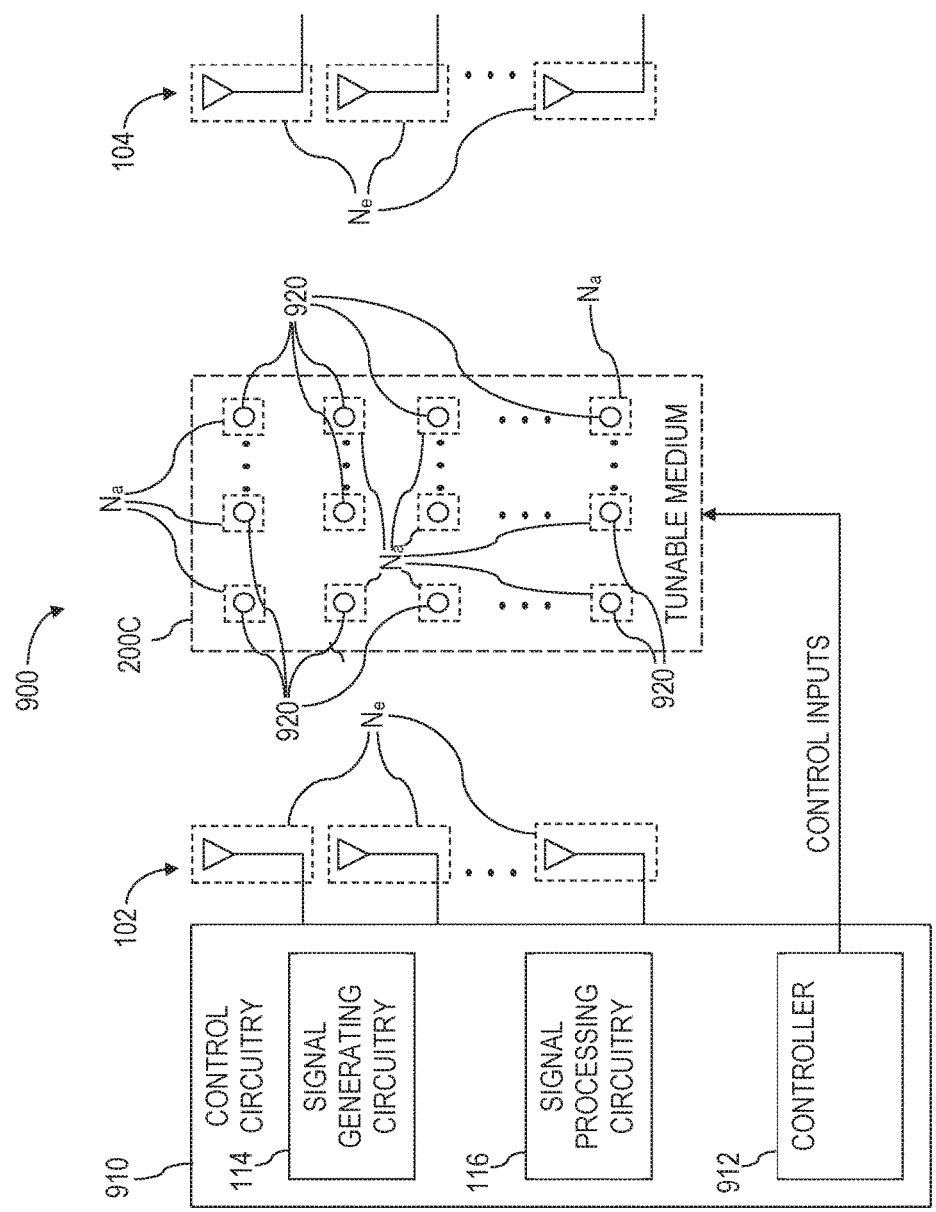
FIG. 9 is a simplified block diagram of an antenna system, according to some embodiments.

FIG. 9 is a simplified block diagram of an antenna system 900, according to some embodiments. The antenna system 900 includes the near-end EM radiating elements 102 and the far-end EM radiating elements 104 discussed above with respect to the antenna system 100 of FIG. 1. The antenna system 900 also includes a tunable medium 200C similar to the tunable medium 200 of FIG. 1. The antenna system 900 further includes control circuitry 910 that is similar to the control circuitry 110 of FIG. 1 (e.g., the control circuitry 910 includes the signal generation circuitry 114 and the signal processing circuitry 116 of the control circuitry 110 of FIG. 1). The control circuitry 910, however, includes a controller 912. Similar to the controller 112 of FIG. 1, the controller 912 is configured to control the tunable medium 200C to function as a linear precoder (when the near-end EM radiating elements 102 are transmitting) and a linear decoder (when the near-end EM radiating elements 102 are receiving), as discussed above. The controller 912, however, is configured to control the tunable medium 200C in terms of modeled lumped ports.

In the example of FIG. 9, the controller 912 is configured to associate a plurality of tunable EM scattering elements 920 of the tunable medium 200C with a plurality of internal lumped ports $N_a$. The controller 912 is also configured to associate the near-end EM radiating elements 102 and the far-end EM radiating elements 104 as external lumped ports $N_e$. Accordingly, the controller 912 is configured to identify lumped ports N including both the internal lumped ports $N_a$ and the external lumped ports $N_e$.

The controller 912 is configured to determine an S-matrix relating field amplitudes at the lumped ports N. The controller 912 is also configured to determine at least a portion of component values of a desired S-matrix relating the field amplitudes at the lumped ports N. The controller 912 is further configured to modify control inputs configured to tune the tunable EM scattering elements 920 to implement the desired S-matrix.

The controller 912 is configured to analyze the S-matrix and the desired S-matrix in terms of their static and dynamic components. By way of non-limiting example, the controller 912 may be configured to determine the S-matrix as a function of an impedance matrix (Z-matrix) and an admittance vector (y-vector). The Z-matrix includes impedance values relating voltage potentials at each of the lumped ports N to currents at each of the lumped ports N with all others of the lumped ports open at an operational frequency of the antenna system 900. The y-vector is a diagonal matrix including impedance values of the lumped ports N. The Z-matrix represents the static components of the S-matrix, and the y-vector represents the dynamic components of the S-matrix.

Also by way of non-limiting example, the controller 912 may be configured to determine the S-matrix as a function of an admittance matrix (Y-matrix) and an impedance vector (z-vector). The Y-matrix includes admittance values relating voltage potentials at each of the lumped ports N to currents at each of the lumped ports N with all others of the lumped ports open at an operational frequency of the antenna system 900. The z-vector is a diagonal matrix including impedance values of the lumped ports N. The Y-matrix represents the static components of the S-matrix, and the z-vector represents the dynamic components of the S-matrix.

The S-matrix (and the desired S-matrix) may, then, be expressed as a function of the Z-matrix and the y-vector, or equivalently as a function of the Y-matrix and the z-vector, as follows:

$$S=(\sqrt{y}Z\sqrt{y}-1)(\sqrt{y}Z\sqrt{y}+1)^{-1}=(1-\sqrt{z}Y\sqrt{z})(1+\sqrt{z}Y\sqrt{z})^{-1}$$

Since the Z-matrix and the Y-matrix represent static components of the S-matrix, the components of these matrices do not change as the impedance of the tunable EM scattering elements 920 is modified by the control inputs from the controller 912. The z-vector and the y-vector, however, do change as the impedance of the tunable EM scattering elements 920 is modified. Accordingly, as the controller 912 computes an S-matrix or a desired S-matrix, only the z-vector or y-vector need be accounted for once the Z-matrix or the Y-matrix has been established, reducing complexity computations subsequent to a first determination of the S-matrix or desired S-matrix.

More specifically, as the z-vector and the y-vector have only $N_e+N_a$ components that can be non-zero, optimization calculations scale relatively linearly with the number of degrees of freedom. By contrast, if the static portions of the S-matrix or desired S-matrix are instead simulated or computed for each iteration of the optimization calculation, the complexity of the calculations scales as N×N, which is more computationally expensive. As a result, resources may be conserved by taking the lumped ports approach disclosed herein. Also, the lumped ports approach disclosed herein may be more suitable for real-time adjustments of the tunable medium 200C.

Figure 10:
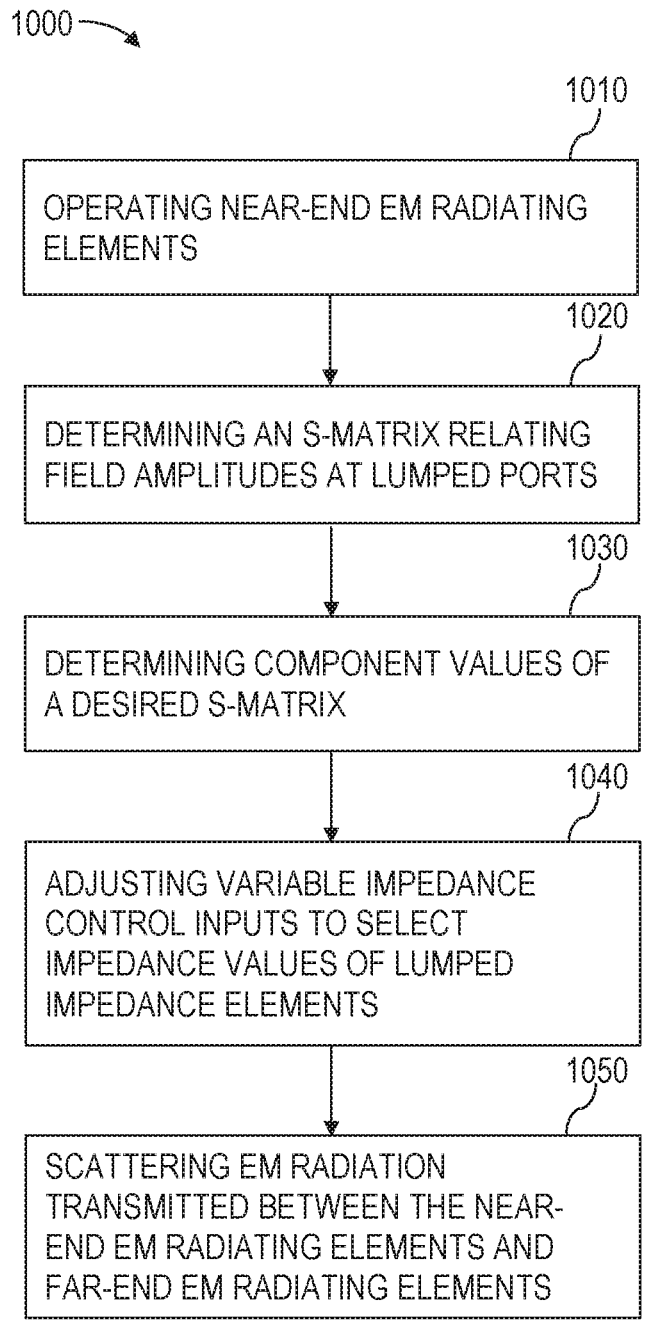
FIG. 10 is a simplified flowchart illustrating a method of operating an antenna system, according to some embodiments.

FIG. 10 is a simplified flowchart illustrating a method 1000 of operating an antenna system (e.g., the antenna system 100, 400, 500, 600, 900), according to some embodiments. By way of non-limiting example, the method 1000 may be implemented, at least in part, by the control circuitry 110A of FIG. 8. Referring to FIGS. 9 and 10 together, the method 1000 includes operating 1010 a plurality of near-end EM radiating elements 102. In some embodiments, operating 1010 a plurality of near-end EM radiating elements 102 includes operating the plurality of near-end EM radiating elements 102 as transmitting antennas. In some embodiments, operating 1010 a plurality of near-end EM radiating elements 102 includes operating the plurality of near-end EM radiating elements 102 as receiving antennas. In some embodiments, operating 1010 a plurality of near-end EM radiating elements 102 includes operating the plurality of near-end EM radiating elements 102 as both transmitting antennas and receiving antennas.

The method 1000 also includes determining 1020 an S-matrix relating field amplitudes at lumped ports $N_e$, $N_a$ including internal lumped ports $N_a$ and external lumped ports $N_e$. The internal lumped ports $N_a$ are located internally to the tunable medium (e.g., on or in the tunable medium 200C). Each of the internal lumped ports $N_a$ corresponds to a different one of lumped impedance elements associated with subwavelength tunable EM scattering elements 920 of a tunable medium 200C. The tunable medium 200C is positioned relative to the plurality of near-end EM radiating elements 102 and a plurality of far-end EM radiating elements 104 to scatter EM radiation transmitted between the plurality of near-end EM scattering elements 102 and the plurality of far-end EM radiating elements 104. The external lumped ports $N_e$ are located externally to the tunable medium 200C. Each of at least a portion of the external lumped ports $N_e$ corresponds to a different one of the plurality of near-end EM radiating elements 102 and the plurality of far-end EM radiating elements 104.

The method 1000 further includes determining 1030 at least a portion of component values of a desired S-matrix relating the field amplitudes at the lumped ports. In some embodiments, determining 1030 at least a portion of component values of a desired S-matrix includes determining the S-matrix as a function of a Z-matrix and a y-vector. In some embodiments, determining 1030 at least a portion of component values of a desired S-matrix includes determining the S-matrix as a function of a Y-matrix and a z-vector.

The method 1000 also includes adjusting 1040 at least one variable impedance control input CONTROL INPUTS configured to enable selection of an impedance value for each of the lumped impedance elements. Adjusting 1040 includes modifying the impedance value of at least one of the lumped impedance elements to cause the S-matrix to modify to at least approximate at least a portion of the desired S-matrix.

The method 1000 further includes scattering 1050 the EM radiation transmitted between the plurality of near-end EM radiating elements 102 and the plurality of far-end EM radiating elements 104 with the tunable medium 200C. In some embodiments, scattering 1050 the EM radiation includes precoding the EM radiation as one of a linear beamforming precoder, a linear spatial-diversity precoder, or a linear spatial multiplexing precoder. In some embodiments, scattering 1050 the EM radiation includes decoding the EM radiation as one of a linear beamforming decoder, a linear spatial-diversity decoder, or a linear spatial multiplexing decoder.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Furthermore, the disclosure contemplates combinations of any of the disclosed embodiments and examples, except as would be incompatible in practice, as would be understood by those skilled in the art.

What is claimed is:

1. An antenna system, comprising:
a plurality of near-end electromagnetic (EM) radiating elements;
a tunable medium positioned relative to the plurality of near-end EM radiating elements and a plurality of far-end EM radiating elements to scatter EM radiation transmitted between the plurality of near-end EM radiating elements and the plurality of far-end EM radiating elements, the tunable medium comprising:
subwavelength EM scattering elements corresponding to lumped impedance elements; and variable impedance control inputs configured to enable selection of an impedance value for each of the lumped impedance elements; and control circuitry comprising a controller operably coupled to the variable impedance control inputs of the tunable medium and programmed to:

determine a scattering matrix (S-matrix) relating field amplitudes at lumped ports, the lumped ports including:

internal lumped ports located internally to the tunable medium, each of the internal lumped ports corresponding to a different one of the lumped impedance elements of the tunable medium; and external lumped ports located externally to the tunable medium, each of at least a portion of the external lumped ports corresponding to a different one of the plurality of near-end EM radiating elements and the plurality of far-end EM radiating elements;

determine at least a portion of component values of a desired S-matrix relating the field amplitudes at the lumped ports; and adjust at least one of the variable impedance control inputs to modify the impedance value of at least one of the lumped impedance elements to cause the S-matrix to modify to at least approximate at least a portion of the desired S-matrix.

2. The antenna system of claim 1, wherein the control circuitry further comprises signal generation circuitry operably coupled to the plurality of near-end EM radiating elements and configured to deliver EM signals including a plurality of different data streams to the plurality of near-end EM radiating elements for transmission to the plurality of far-end EM radiating elements.

3. The antenna system of claim 2, wherein the desired S-matrix implements a linear beamforming precoder.

4. The antenna system of claim 2, wherein the desired S-matrix implements a linear spatial-diversity precoder.

5. The antenna system of claim 2, wherein the desired S-matrix implements a linear spatial multiplexing precoder.

6. The antenna system of claim 2, wherein the controller is programmed to determine values of control parameters to be input to the variable impedance control inputs of the tunable medium.

7. The antenna system of claim 6, wherein the controller is programmed to determine the values of the control parameters by solving an inverse scattering problem, wherein the inverse scattering problem is postulated as an equality between the S-matrix and the desired S-matrix.

8. The antenna system of claim 6, wherein the controller is programmed to determine the values of the control parameters by determining a minimization of a matrix norm of a difference between the S-matrix and the desired S-matrix.

9. The antenna system of claim 6, wherein the controller is programmed to determine the values of the control parameters of the tunable medium by determining a minimization of a sum of squared differences between at least a portion of component values from the S-matrix and corresponding component values of the desired S-matrix.

10. The antenna system of claim 9, wherein the at least a portion of component values from the S-matrix relates field amplitudes at the plurality of near-end EM radiating elements to field amplitudes at the plurality of far-end EM radiating elements.

11. The antenna system of claim 6, wherein the controller is programmed to determine the values of the control parameters by determining a minimization of a sum of squared differences between at least a portion of component values from the S-matrix and corresponding component values of the desired S-matrix, plus a weighted sum of frequency dispersion magnitudes of the portion of component values.

12. The antenna system of claim 1, wherein the control circuitry further comprises signal processing circuitry operably coupled to the plurality of near-end EM radiating elements and configured to receive EM signals including a plurality of different data streams from the plurality of far-end EM radiating elements through the plurality of near-end EM radiating elements.

13. The antenna system of claim 12, wherein the desired S-matrix implements a linear beamforming decoder.

14. The antenna system of claim 12, wherein the desired S-matrix implements a linear spatial-diversity decoder.

15. The antenna system of claim 12, wherein the desired S-matrix implements a linear spatial multiplexing decoder.

16. The antenna system of claim 12, wherein a subset of the S-matrix includes a submatrix comprising component values that relate field amplitudes at the plurality of far-end EM radiating elements to field amplitudes at the plurality of near-end EM radiating elements.

17. The antenna system of claim 16, wherein the controller is programmed to determine the desired S-matrix to include a desired submatrix corresponding to the submatrix, the desired submatrix at least approximately equal to a diagonal matrix.

18. The antenna system of claim 16, wherein the controller is programmed to determine the desired S-matrix to include a desired submatrix corresponding to the submatrix, the desired submatrix including off-diagonal elements, wherein a magnitude of each of the off-diagonal elements is less than or equal to a predetermined threshold value.

19. The antenna system of claim 12, wherein the lumped ports include far-end internal lumped ports, wherein the far-end internal lumped ports correspond to lumped impedance elements of a far-end tunable medium.

20. The antenna system of claim 12, wherein the controller is programmed to determine the S-matrix as a function of an impedance matrix (Z-matrix) and an admittance vector (y-vector), wherein the Z-matrix includes impedance values relating voltage potentials at each of the lumped ports to currents at each of the lumped ports with all others of the lumped ports open at an operational frequency of the antenna system, and the y-vector is a diagonal matrix including admittance values of the lumped ports.

21. The antenna system of claim 12, wherein the controller is programmed to determine the S-matrix as a function of an admittance matrix (Y-matrix) and an impedance vector (z-vector), wherein the Y-matrix includes admittance values relating voltage potentials at each of the lumped ports to currents at each of the lumped ports with all others of the lumped ports open at an operational frequency of the antenna system and the z-vector is a diagonal matrix including impedance values of the lumped ports.

22. A method of operating an antenna system, the method comprising:

operating a plurality of near-end electromagnetic (EM) radiating elements;

determining a scattering matrix (S-matrix) relating field amplitudes at lumped ports including:

internal lumped ports located internally to a tunable medium, each of the internal lumped ports corresponding to a different one of lumped impedance elements associated with subwavelength EM scattering elements of the tunable medium positioned relative to the plurality of near-end EM radiating elements and a plurality of far-end EM radiating elements to scatter EM radiation transmitted between the plurality of near-end EM radiating elements and the plurality of far-end EM radiating elements; and external lumped ports located externally to the tunable medium, each of at least a portion of the external lumped ports corresponding to a different one of the plurality of near-end EM radiating elements and the plurality of far-end EM radiating elements;

determining at least a portion of component values of a desired S-matrix relating the field amplitudes at the lumped ports;

adjusting at least one variable impedance control input configured to enable selection of an impedance value for each of the lumped impedance elements, wherein adjusting includes modifying the impedance value of at least one of the lumped impedance elements to cause the S-matrix to modify to at least approximate at least a portion of the desired S-matrix; and scattering the EM radiation transmitted between the plurality of near-end EM radiating elements and the plurality of far-end EM radiating elements with the tunable medium.

23. The method of claim 22, further comprising delivering EM signals including a plurality of different data streams to the plurality of near-end EM radiating elements for transmission to the plurality of far-end EM radiating elements.

24. The method of claim 23, wherein determining an S-matrix relating field amplitudes at lumped ports includes determining the S-matrix to include a submatrix comprising component values that relate field amplitudes at the plurality of near-end EM radiating elements to field amplitudes at the plurality of far-end EM radiating elements.

25. The method of claim 24, wherein determining at least a portion of component values of a desired S-matrix comprises determining the desired S-matrix to include a desired submatrix corresponding to the submatrix, the desired submatrix at least approximately equal to a diagonal matrix.

26. The method of claim 24, wherein determining at least a portion of component values of a desired S-matrix comprises determining the desired S-matrix to include off-diagonal elements, wherein a magnitude of each of the off-diagonal elements is less than or equal to a predetermined threshold value.

27. The method of claim 23, wherein determining an S-matrix relating field amplitudes at lumped ports includes determining the S-matrix considering far-end internal lumped ports, wherein the far-end internal lumped ports correspond to lumped impedance elements of a far-end tunable medium.

28. The method of claim 23, wherein determining at least a portion of component values of a desired S-matrix comprises determining the S-matrix as a function of an impedance matrix (Z-matrix) and an admittance vector (y-vector), wherein the Z-matrix includes impedance values relating voltage potentials at each of the lumped ports to currents at each of the lumped ports with all others of the lumped ports open at an operational frequency of the antenna system, and the y-vector is a diagonal matrix including admittance values of the lumped ports.

29. The method of claim 23, wherein determining at least a portion of component values of a desired S-matrix comprises determining the S-matrix as a function of an admittance matrix (Y-matrix) and an impedance vector (z-vector), wherein the Y-matrix includes impedance values relating voltage potentials at each of the lumped ports to currents at each of the lumped ports with all others of the lumped ports open at an operational frequency of the antenna system, and the z-vector is a diagonal matrix including impedance values of the lumped ports.

30. The method of claim 22, further comprising receiving EM signals including a plurality of different data streams from the plurality of far-end EM radiating elements through the plurality of near-end EM radiating elements.

31. The method of claim 30, wherein determining at least a portion of component values of a desired S-matrix comprises determining the at least a portion of component values of the desired S-matrix to implement a linear beamforming decoder.

32. The method of claim 30, wherein determining at least a portion of component values of a desired S-matrix comprises determining the at least a portion of component values of the desired S-matrix to implement a linear spatial-diversity decoder.

33. The method of claim 30, wherein determining at least a portion of component values of a desired S-matrix comprises determining the at least a portion of component values of the desired S-matrix to implement a linear spatial multiplexing decoder.

34. The method of claim 30, further comprising determining values of control parameters to be input to the variable impedance control inputs of the tunable medium.

35. The method of claim 34, wherein determining values of control parameters comprises solving an inverse scattering problem, wherein the inverse scattering problem is postulated as an equality between the S-matrix and the desired S-matrix.

36. The method of claim 34, wherein determining values of control parameters comprises determining a minimization of a matrix norm of a difference between the S-matrix and the desired S-matrix.

37. The method of claim 34, wherein determining values of control parameters comprises determining a minimization of a sum of squared differences between at least a portion of component values from the S-matrix and corresponding component values of the desired S-matrix.

38. The method of claim 37, wherein the at least a portion of component values from the S-matrix comprises component values of the S-matrix that relate field amplitudes at the plurality of far-end EM radiating elements to field amplitudes at the plurality of near-end EM radiating elements.

39. The method of claim 34, wherein determining values of control parameters comprises determining a minimization of a sum of squared differences between at least a portion of component values from the S-matrix and corresponding component values of the desired S-matrix, plus a weighted sum of frequency dispersion magnitudes of the portion of component values.

* * * * *